United States Patent
Skiba et al.

(10) Patent No.: US 6,366,988 B1
(45) Date of Patent: Apr. 2, 2002

(54) SYSTEMS AND METHODS FOR ELECTRONIC DATA STORAGE MANAGEMENT

(75) Inventors: Mark Skiba, Marina del Rey, CA (US); Mikhail Ryzhkin, Las Vegas, NV (US)

(73) Assignee: Storactive, Inc., Marina Del Rey, CA (US)

(*) Notice: Subject to any disclaimer, the term of this patent is extended or adjusted under 35 U.S.C. 154(b) by 0 days.

(21) Appl. No.: 09/118,218

(22) Filed: Jul. 17, 1998

Related U.S. Application Data

(60) Provisional application No. 60/053,119, filed on Jul. 18, 1997.

(51) Int. Cl.[7] .................... G06F 12/00; G06F 13/00
(52) U.S. Cl. ............... 711/165; 711/100; 711/170; 711/202; 707/203
(58) Field of Search .................... 707/204, 203; 711/165, 170, 203, 100, 200

(56) References Cited

U.S. PATENT DOCUMENTS

| | | | | |
|---|---|---|---|---|
| 4,558,302 A | | 12/1985 | Welch | 341/41 |
| 5,086,502 A | * | 2/1992 | Malcolm | 714/8 |
| 5,159,671 A | * | 10/1992 | Iwami | 710/20 |
| 5,168,444 A | * | 12/1992 | Cukor et al. | 705/1 |
| 5,193,176 A | * | 3/1993 | Brandin | 714/14 |
| 5,212,874 A | * | 5/1993 | Anderson et al. | 33/21.2 |
| 5,276,867 A | | 1/1994 | Kenley et al. | 707/204 |
| B14,558,302 A | | 1/1994 | Welch | 341/51 |
| 5,321,826 A | * | 6/1994 | Ushiro | 711/162 |
| 5,367,698 A | | 11/1994 | Webber et al. | 709/203 |
| 5,479,654 A | | 12/1995 | Squibb | 395/600 |
| 5,564,037 A | | 10/1996 | Lam | 711/161 |
| 5,611,069 A | * | 3/1997 | Matoba | 711/114 |
| 5,617,566 A | | 4/1997 | Malcolm | 707/204 |
| 5,734,340 A | * | 3/1998 | Kennedy | 341/59 |
| 5,765,198 A | * | 6/1998 | McCrocklin et al. | 711/165 |
| 5,778,395 A | | 7/1998 | Whiting et al. | 707/204 |
| 5,787,485 A | * | 7/1998 | V et al. | 711/162 |
| 5,978,791 A | * | 11/1999 | Farber et al. | 707/2 |
| 6,122,758 A | * | 9/2000 | Johnson et al. | 714/47 |
| 6,134,673 A | * | 10/2000 | Chrabaszcz et al. | 713/1 |
| 6,154,835 A | * | 11/2000 | Chrabaszcz et al. | 713/1 |
| 6,175,904 B1 | * | 1/2001 | Gunderson | 711/162 |

OTHER PUBLICATIONS

Structure Computer Organization, 3rd edition, 1990; Andrew S. Tanenbaum; pp. 338–339).*

Richard F. Scocoazza; Bear Stearns Equity Research "Enterprise Software"; Apr. 1998; pp 4–36.

* cited by examiner

*Primary Examiner*—Tuan V. Thai
(74) *Attorney, Agent, or Firm*—Christie, Parker & Hale, LLP

(57) ABSTRACT

Systems and methods for improved electronic data storage management that allow the file system to physically adapt and optimize to a variety of add-on hardware components (such as hard disks, removable drives, CD ROM drives, etc.) while virtually maintaining a stable system configuration from an application software point of view. The Redirector presents a virtual view of the file system by providing a virtual view of logical volumes. Through the use of a Redirector component, all application program file API's to the operating system are filtered; if the file, or directory is redirected, then the call is sent in a modified form to the operating system to its redirected physical location. The physical movement of files is accomplished through the use of a Migrator component. The Migrator makes a copy of the file, verifies the correctness of the copy, updates the redirector table, and then removes the physical file from its original location.

10 Claims, 21 Drawing Sheets

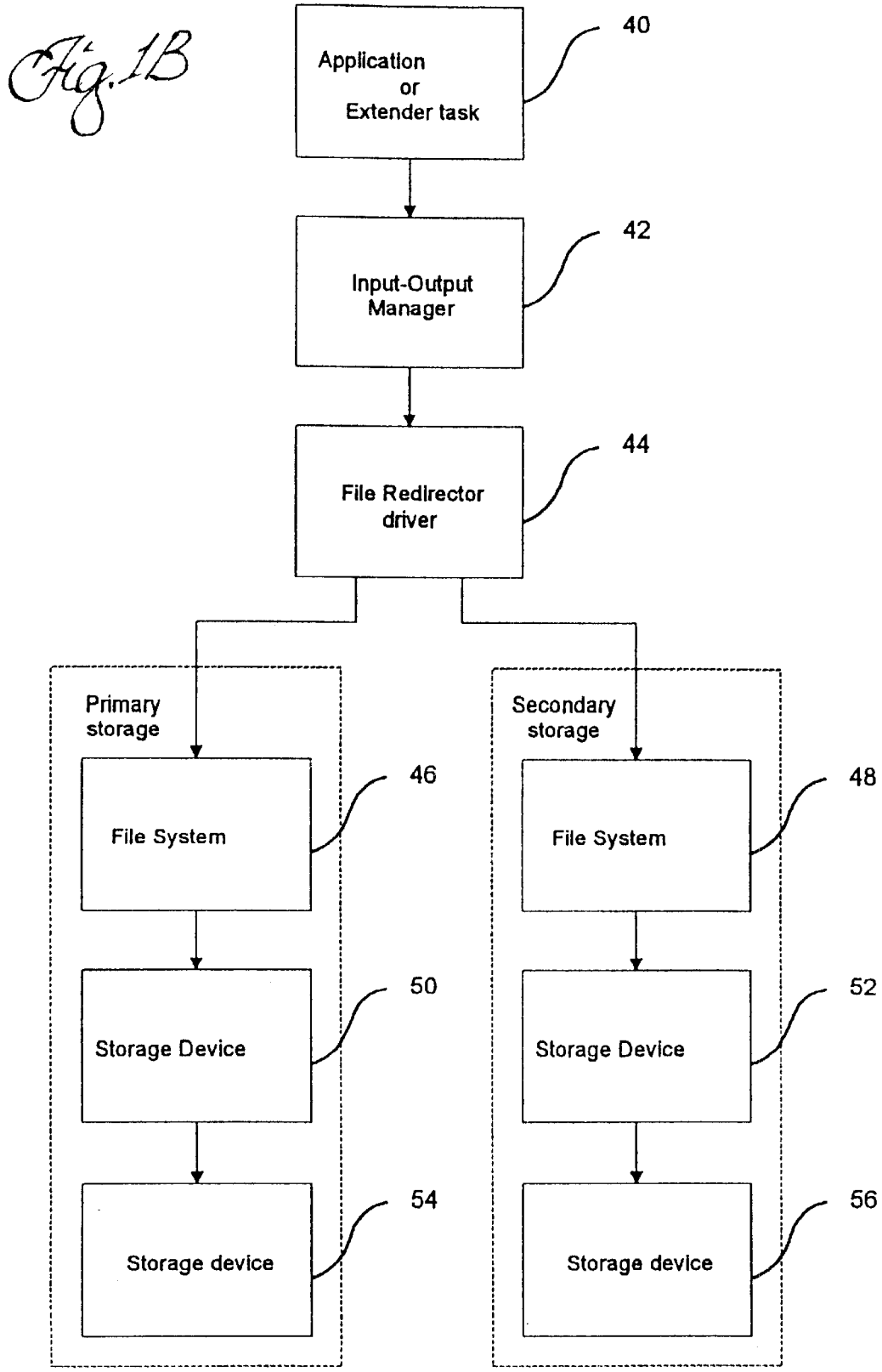

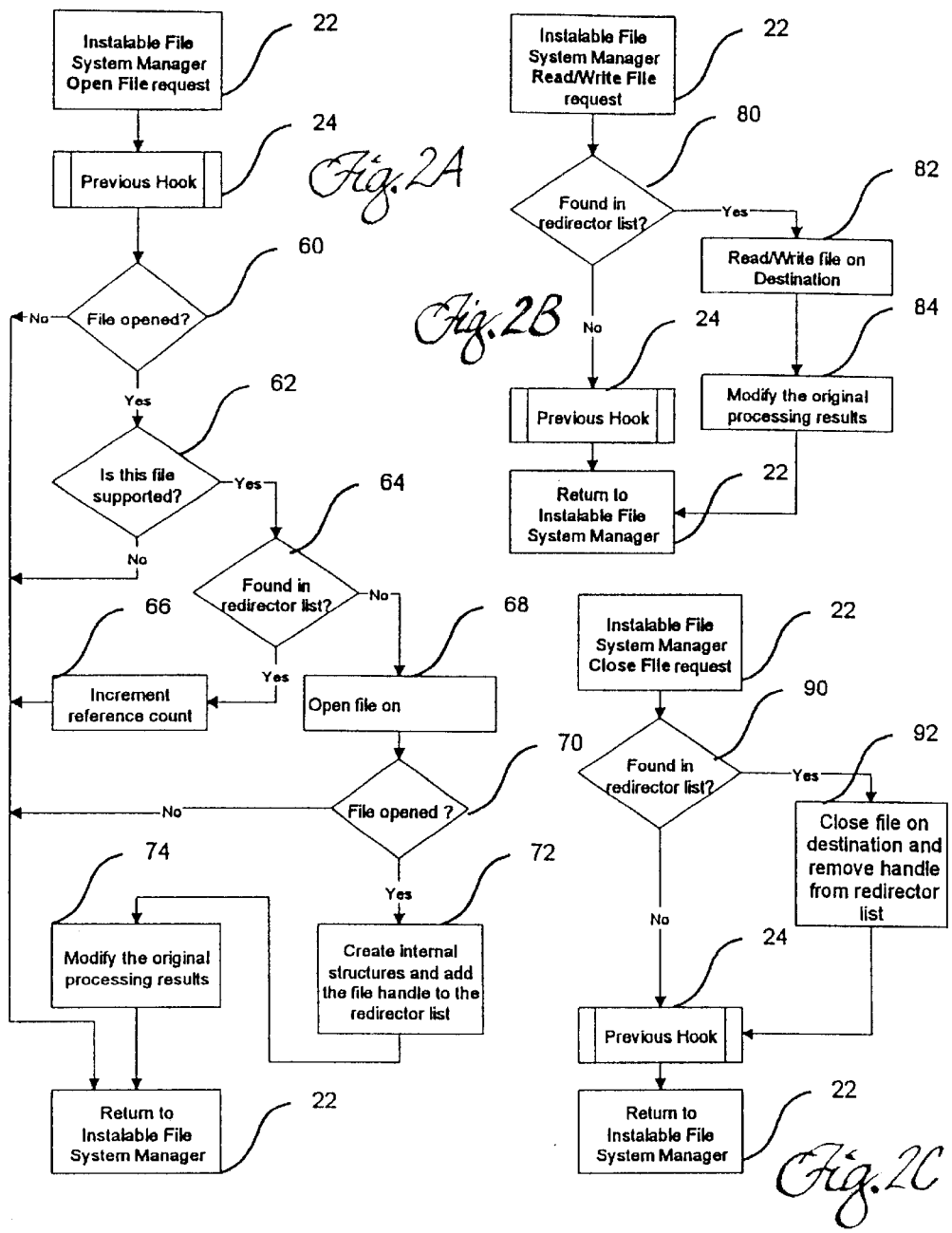

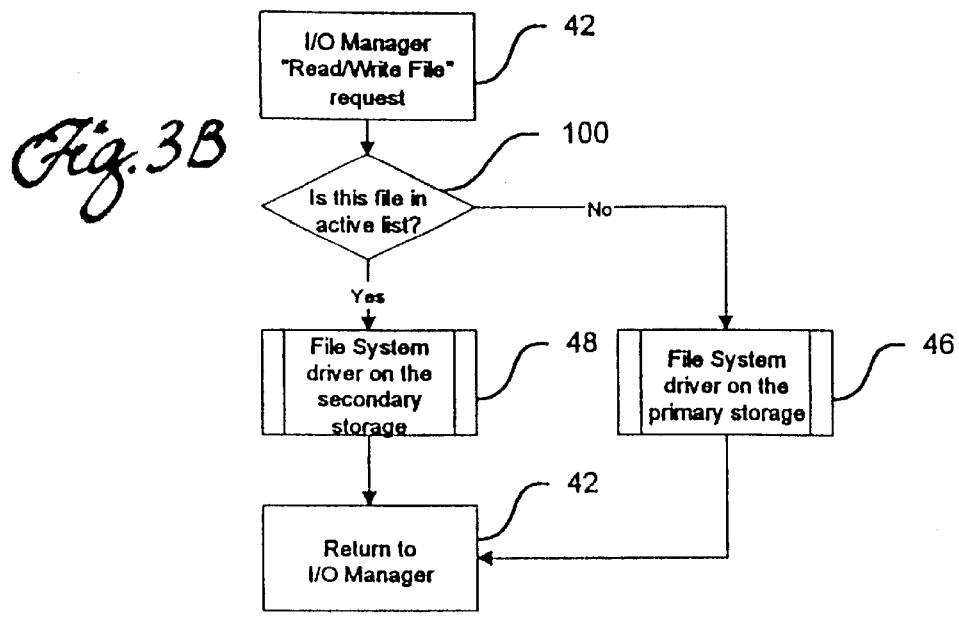
Fig. 3B
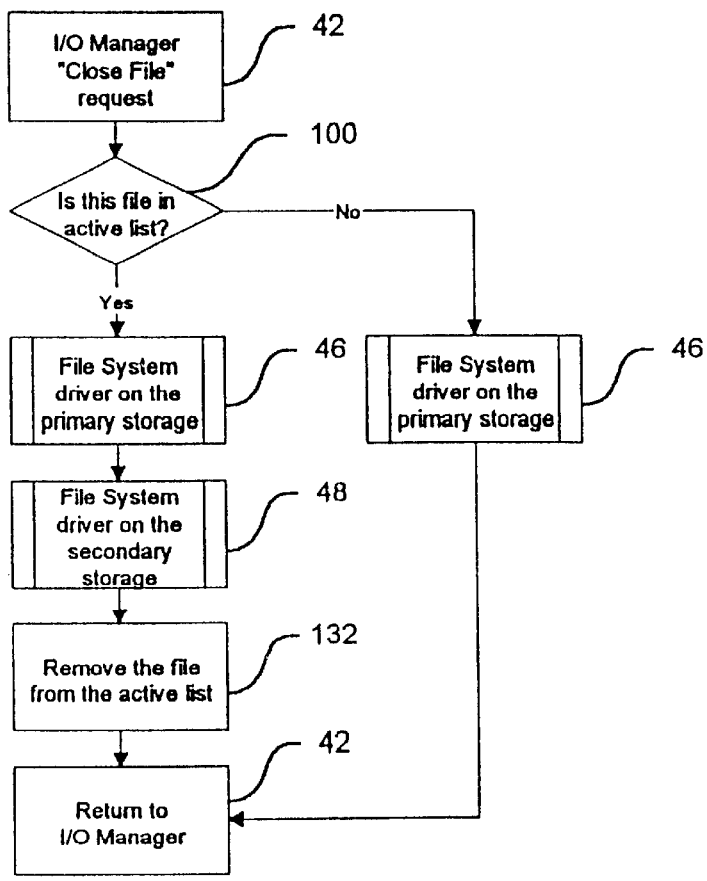

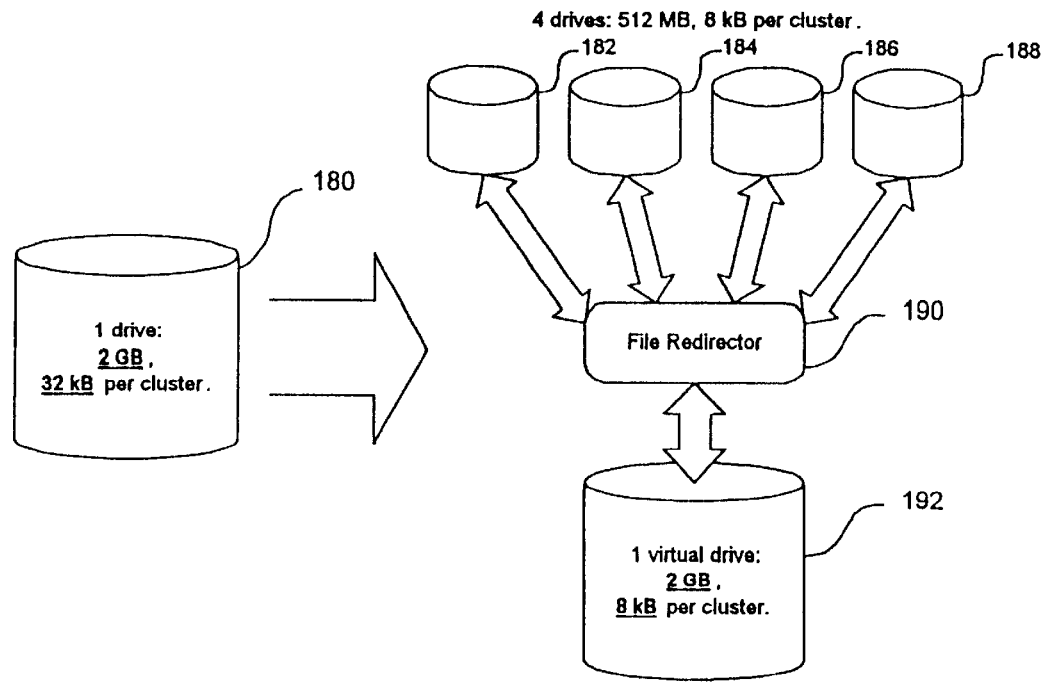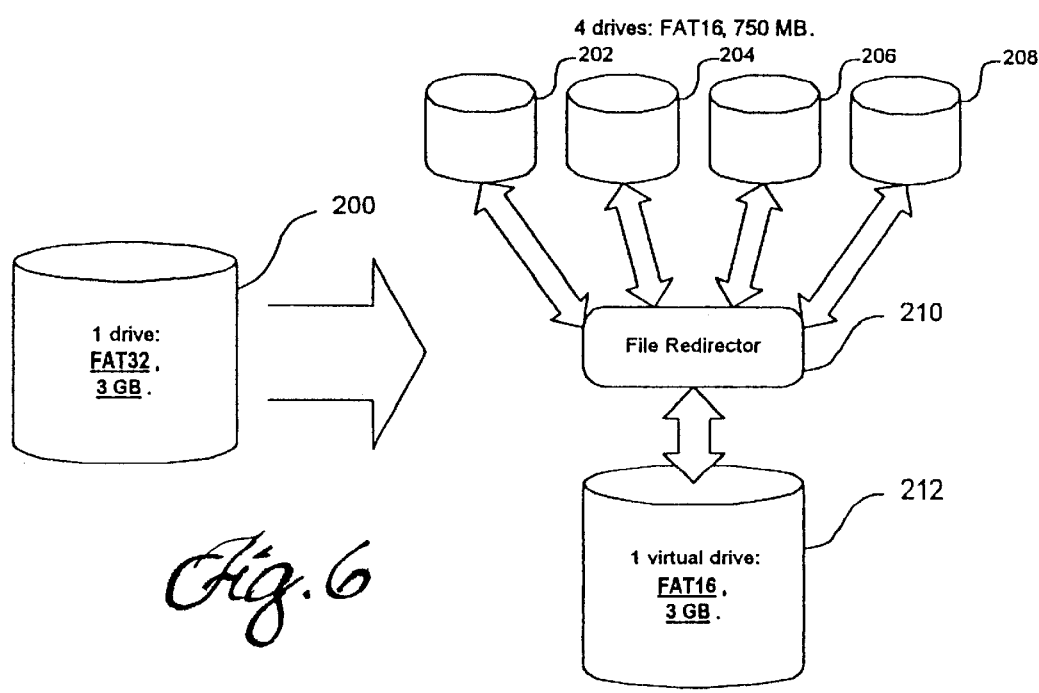
Fig. 6

*Fig. 10*
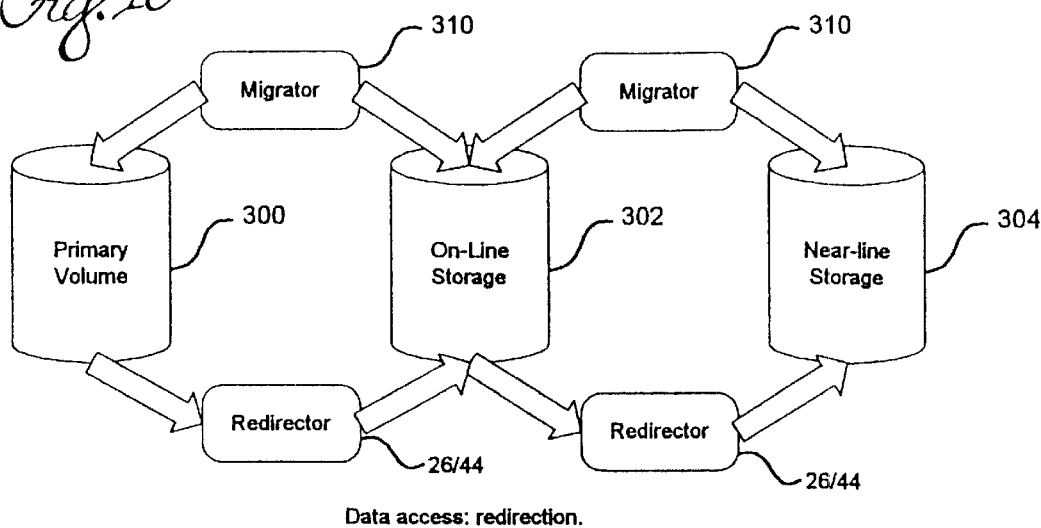
File flow: migration.
Data access: redirection.
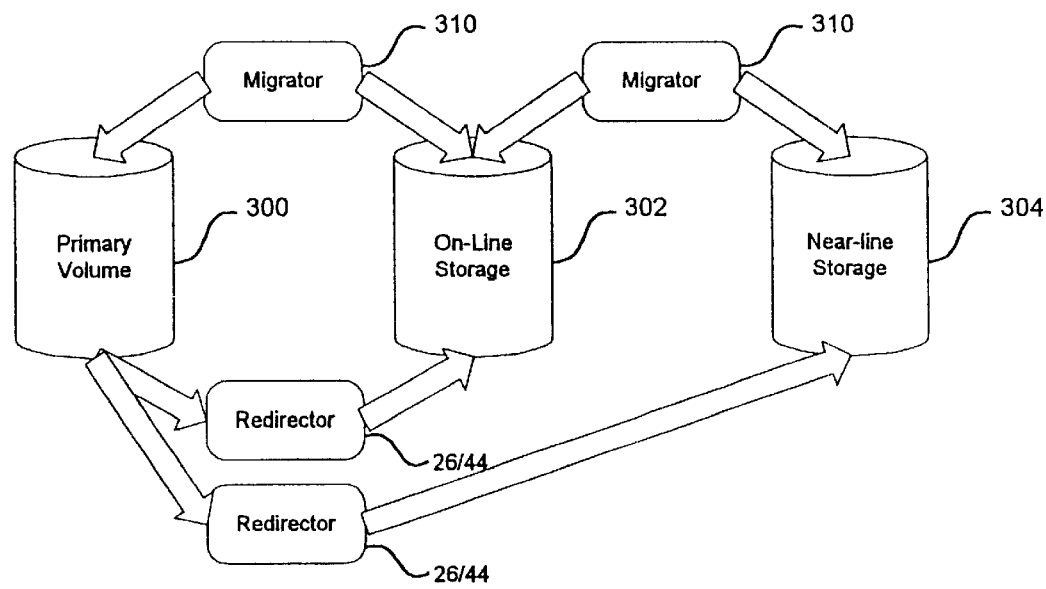
File flow: migration.
Data access: redirection.

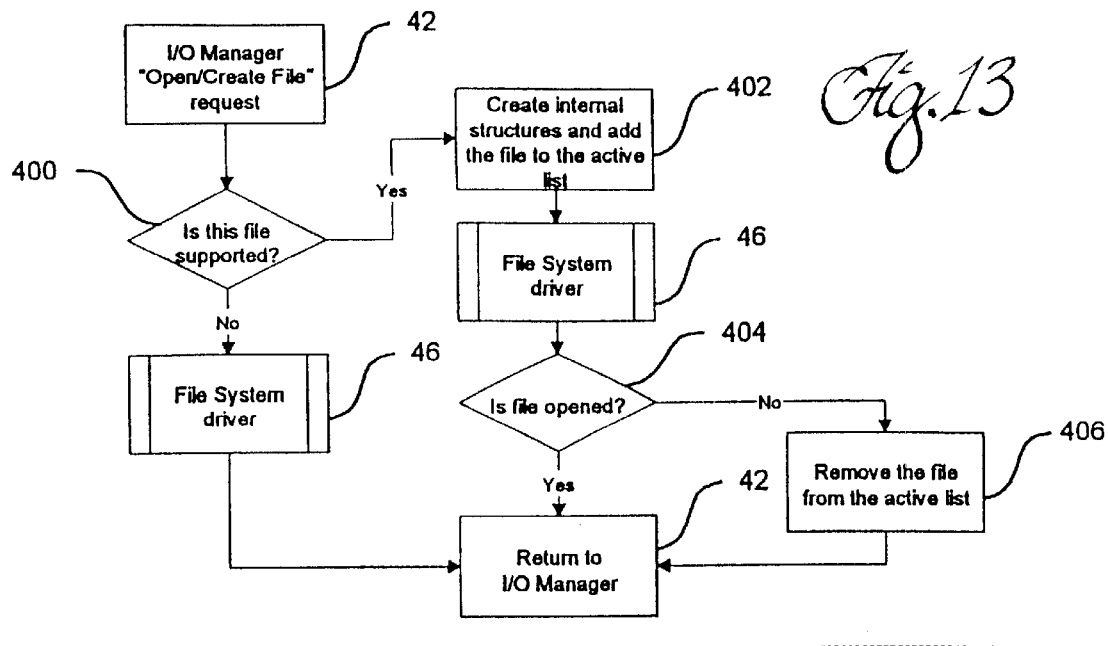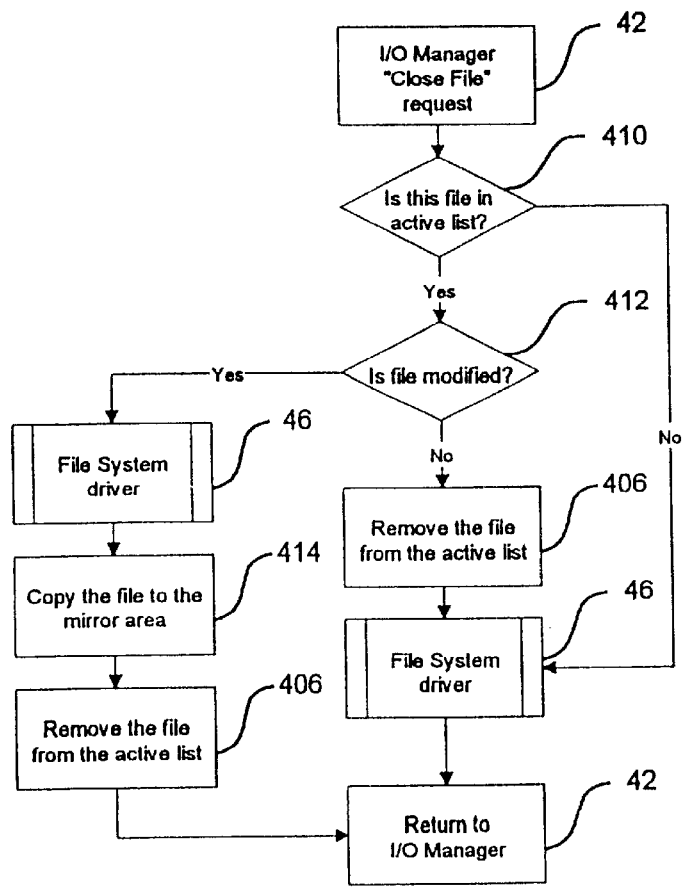
Fig.13

SYSTEMS AND METHODS FOR ELECTRONIC DATA STORAGE MANAGEMENT

CROSS-REFERENCE TO RELATED APPLICATIONS

This application claims priority of U.S. Provisional Patent Application Nos. 60/053,119, filed Jul. 18, 1997, titled "VIRTUAL STORAGE MANAGEMENT SYSTEM," the disclosure of which is incorporated herein by reference, as if fully stated here, for all purposes.

FIELD OF THE INVENTION

The present invention relates generally to electronic data storage management, and more particularly, to systems and methods for electronic data storage management on multiple device types and multiple devices.

BACKGROUND OF THE INVENTION

Information is rapidly becoming the most valuable asset of most companies. At the same time, managing and protecting information is becoming dramatically more complex and difficult due to the explosion in data storage requirements and the shift from centralized to distributed storage of data on enterprise networks. In addition, users are storing more and more data on their desktop and laptop computers. Effectively managing and protecting this critical information is left to information technology (IT) professionals and represents one of their greatest challenges, perhaps even rivaling the Year 2000 challenge.

The financial impact of information loss is enormous. Not only is it costly to recreate lost data but also there are other significant costs such as lost productivity and lost opportunity.

Over the years, IT departments have evolved highly sophisticated and effective means of managing centralized mainframe data, including backup, disaster recovery, and hierarchical storage management (HSM). Achieving the same level of effectiveness and protection at a single workstation, or in a distributed network environment, however, presents quite a challenge.

Since the early days of computing, there has been recognized the need to protect and manage the data that is stored on computers for disaster recovery and archival purposes. Historically, the standard storage management solution was tape backup. With tape backup, data on computers disk memory storage is periodically backed-up to tape. These backups were generally done during off business hours with cycles of full backups and then intermediate incremental backups of files that had changed since the previous backup.

Numerous problems existed with tape backup:

If any data was entered and lost during the time between the scheduled, periodic backups, the data would not be recoverable except by re-entry;

As computers proliferated in organizations, performing tape backups on multiple machines became increasingly time-consuming and difficult to manage. To help overcome this problem, network access to remote machines was added by many backup software vendors;

Backups generally needed to be done during off-business hours due to the negative effect on computer performance and also because many files are locked by applications;

Restoring a file or system from tape backups is generally very time consuming.

Historically, if more free disk space was required on the computer, the operator could create an archive of selected data on tape. After the data was moved to tape, the data could be removed from the hard drive. One problem with this method of migrating data to tape is that if the end user needed to later access the archived data, there was no indication that the file had been migrated. Another problem was in selecting which files would be most suitable for migrating to tape.

Hierarchical Storage Management (HSM) was created to automate the process of data migration. With HSM, files in primary storage are selected for migration to secondary storage according to some criteria, for instance, the file least recently accessed could be selected for migration. With HSM, when the file is moved, a marker file is put in it's place. Depending on the implementation, if the user attempts to access the marker file, the file is returned to its original location or the user is prompted to restore the file from a given tape or removable cartridge. One common problem with this technique is that the file must be restored to its original location. If, during a restoration attempt, HSM determined that adequate space was not available to restore the file to its original location, then the file cannot be accessed.

Extension of disk space across local physical devices can be found built into some file systems such as Window NT's NTFS. For example, in Windows NT, a single disk could be extended by creating a volume set which creates a logical drive that may extend across multiple physical volumes. (Hereinafter, a "volume" refers to a single storage unit. Reference to a physical volume refers to a single physical storage unit, such as a single disk, a single CD ROM, a single tape, etc.; reference to a logical volume or "virtual" volume, refers to data that is located on one or more physical storage units but is treated by the computer system as if the data is located on a single physical storage unit. Reference to a "device" refers to a piece of electronic storage equipment that is capable of accessing a particular type of storage volume, such as a disk drive, a CD ROM drive, a tape drive, etc.) While this accomplished the goal of virtually extending the logical drive, this method is limited to only certain file system formats (the method applies to, for example, NTFS, but not to Windows FAT 16 or FAT 32). Also, this technique lacks flexibility in that space cannot be easily shifted from one volume to another.

Another technique for creating an expanded volume was the use of a Distributed File System such as Microsoft's DFS. Using DFS software, a logical volume can be created where each subfolder may point to a folder on a different volume on any machine in the network. This approach is very useful for creating logical directory structures independent of volume location. While DFS can be used for extending disk space, it was not designed as a disk space extension tool and has a number of limitations. First DFS cannot be used for extending an existing local volume. Further, if a particular volume in the DFS tree runs out of space there is no provision for extending space in that folder across another volume.

Explosion in Storage Requirements

Storage is growing at an exponential rate. International Data Corporation (IDC) has forecasted a 90 percent annual increase in total storage shipments for the next four years, with annual storage shipments surpassing 500,000 terabytes by 2001. That's more than all the data storage shipped during the 1990s. IDC also estimates that the average site capacity will double annually.

The explosion in storage requirements has created two major problems for IT professionals:

Storage Management

It is becoming increasingly difficult to manage and protect the ever increasing and more widely distributed amount of data being stored. As a result, more critical data is being exposed to loss.

Storage Capacity

The exploding storage requirements are continually outgrowing the storage capacity of servers and workstations. As a result, storage capacity must be continually updated, which is costly and disruptive to users.

Increased Vulnerability of Desktop and Laptop Storage

According to Bear Stearns, more than 50 percent of critical data is now stored on desktop and laptop computers. This data is outside the reach of most enterprise storage management software products and is at risk to loss. To get around the problem, many IT departments have encouraged their users to store critical data on network servers to bring it within the reach and control of storage management software. This policy, however, has met with only limited success. Laptop computers present a particularly difficult storage management problem in that most are only occasionally connected to a network and must be able to work offline. This makes storing active data on servers impractical.

There are many Ways in which Data can be Lost

There are many ways that users can corrupt or lose information, including:

Inadvertent File Deletion

A user may unintentionally delete a file that contains critical information. Some protection solutions address this problem, such as the Windows Recycle Bin and utilities that hold information deleted from the Recycle Bin. Even with these solutions, however, users can still lose important data.

Inadvertent File Overwrites

A user may wish to maintain each revision of a document but unintentionally save a new revision of a document over the old one.

New Software Install

In installing or updating software, a user may "break" a working system. That is, the installation process may corrupt or destroy critical information such as system files. This could result in the system no longer working properly.

Lost or Stolen Computer

This problem is primarily associated with laptop computers. When a computer is lost or stolen, all its local storage is lost.

Hardware Failure

This has been a longstanding problem and is even more prevalent in portable computers that are subject to rough treatment.

Attack

Software viruses, Internet hackers, and disgruntled former employees all represent a threat to computer data.

Natural Disaster

Fire, flood, tornado, hurricane, and earthquake can result in significant data loss.

The Costs of Insufficient Data Protection are High

The loss of productivity and disruption caused by information loss can be enormous. Even more significant than the cost of recovering or recreating the lost information is the negative impact on user productivity. Consider, for example, the impact of a sales representative losing a laptop computer containing all customer and prospect contact information.

According to Peter Teige, a Senior Research Associate with Mobile Insights, "[i]n our research we found estimates that as many as 25 percent of mobile PC users experience some major data loss each year due to system failure, loss, or theft. When you break it down, this loss of data translates into significant financial losses. There are estimates that each unrecoverable data loss from a mobile PC represents a financial loss of more than $60,000, on average. It really begins to add up if you take into account all the associated costs, such as lost productivity, investment, opportunity cost, and even the cost of employee turnover that results."

The plummeting costs and increasing capacities of storage devices make it economically feasible to provide protection through replication of distributed data in centralized storage facilities. Hierarchical storage management systems combined with large-scale tape and optical disk hardware, plus storage robots, allow organizations to optimize storage utilization and further reduce the cost of network ownership.

The Requirements for a Solution

Organizations need a storage management solution that enables them to cope with the rapidly increasing storage requirements, the shift from centralized to distributed storage, and the increasing proliferation of data on desktop and laptop computers. To be effective, a storage management solution must meet a number of requirements.

Protection of Recoverable as well as Unrecoverable Data

There are three primary types of stored information, all of which should be protected by an effective storage management solution:

Recoverable Information

Information such as operating system or application software that can be recovered through reinstallation if lost.

Unrecoverable Information

Information such as data, documents, presentations, or spreadsheets that cannot be easily recreated, if they can be recreated at all.

Temporary Information

Information, such as scratch files, that is created and used by applications only while they are running and typically deleted when the application is closed.

The effective storage management solution should address recoverable as well as unrecoverable information. The need to protect unrecoverable data is obvious—unless it is protected, it must be manually recreated if it is lost.

The effective storage management solution should also protect recoverable data. Although this information may be recoverable through a reinstall process, the reinstall process can be extremely time consuming and typically requires user input and interaction. For example, in reinstalling an updated application, a user must install the application plus all the updates. In addition, the user must reset all favorites, preferences, and options to restore the application to its exact state prior to the loss.

Continuous Protection

It is important that data be protected on a real-time continuous basis as opposed to a scheduled periodic basis. That means, every time a file is changed, the changes should be immediately recorded. Continuous protection provides more coverage than scheduled periodic protection in that a user can activate backup by simply saving a file after making changes. In this way, the amount of work lost in the event of a system or application failure is minimized.

Versioning

An optimal storage management solution should provide for versioning of data, application programs and the operating system. In many cases, a user needs to return to an earlier operating version of a system if a problem occurs during the installation or update of an application or system software. For example, if an application update breaks the application so that it no longer works, or worse yet, breaks the operating system, then the user should be able to return to the previously working version of the application or system. In an optimal storage management solution, the user should be able to rewind to the previously working version of the application or system rather than reinstalling the original application plus all its updates and resetting all preferences and options.

Performance

An optimal storage management solution not noticeably impact the performance of desktop or laptop PCs. Wherever possible, storage management software should operate in the background and allow users to continue with their jobs with little or no interruption or delay.

SUMMARY OF THE INVENTION

The present invention meets the requirements discussed in the previous section. The present invention applies to implementation on an individual computer workstation and to implementation on a local area network (LAN) environment.

DESCRIPTION OF THE DRAWINGS

These and other features, aspects, and advantages of the present invention will become better understood with regard to the following description, appended claims, and accompanying drawings where:

FIG. 1B is a schematic block diagram showing the general architecture of the Virtual Storage File Management System (VSMS) for the Windows NT platform.

FIGS. 2A, 2B, and 2C are flow diagrams showing the processing of redirected file requests for Open (2A), Read/Write (2B), and Close (2C) operations for the Windows 95/98 platform.

FIG. 3B is a flow diagram showing the processing for redirected file Read/Write and Close requests for the Windows NT platform.

FIG. 6 is a schematic diagram representing two possible approaches for merging partitioned space and the storage efficiencies resulting from the two approaches.

FIG. 10 is a set of two schematic diagrams representing two methods of accessing the migrated files in the Virtual Storage Management System.

FIG. 13 is a set of two flow diagrams showing the mirroring process of maintaining an identical copy of an original file at an alternative location under the Windows NT platform.

DETAILED DESCRIPTION OF THE INVENTION

Figure 1A:
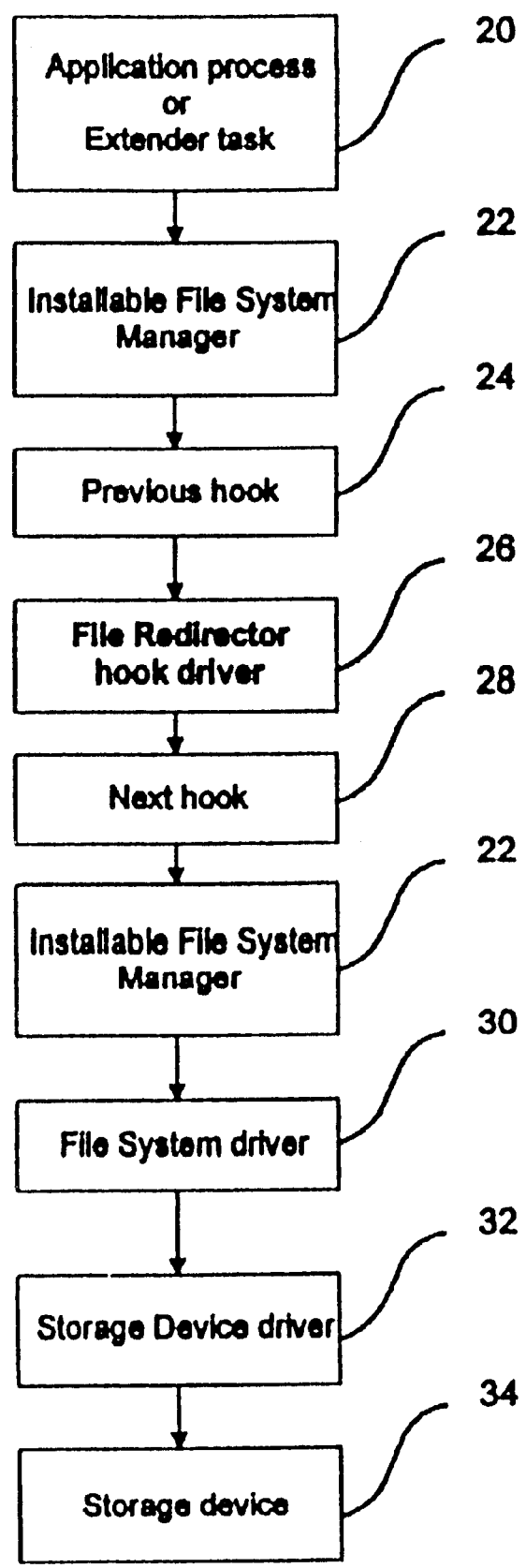
FIG. 1A is a schematic block diagram showing the general architecture of the Virtual Storage File Management System (VSMS) for the Windows 95/98 platform.

The invention provides the capabilities that organizations need to meet the storage management challenge. The following capabilities and aspects of the current invention are disclosed in more detail below:

A. Virtual Storage Management System
    1. The Redirector
    2. The Migrator
  B. Data protection
    1. Versioning
    2. Mirroring
  C. Continuous Protection The invention provides these capabilities using advanced storage management technology that ensures the highest level of protection for valuable data. The invention helps reduce the impact of user errors and hardware and software failures on business. In one embodiment, the invention runs on Windows 95, Windows 98, and Windows NT platforms.

A. Virtual Storage Management System

The Virtual Storage Management System (VSMS) component of the invention provides a number of innovations that allow the file system to physically adapt and optimize to a variety of add-on hardware components (such as hard disks, removable drives, CD ROM drives, etc.) while virtually maintaining a stable system configuration from an application software point of view. VSMS achieves these innovations through the use of a design consisting of 2 major components: a Redirector, and a Migrator.

1. The Redirector

The Redirector presents a virtual view of the file system by providing a virtual view of logical volumes. Through the use of a redirector component, all application program file API's to the operating system are filtered; if the file, or directory is redirected, then the call is sent in a modified form to the operating system to its redirected physical location. The Redirector is implemented in several ways to provide a virtual view of logical volumes, including but not limited to:

Volume redirection whereby an entire logical volume is redirected to another physical volume.

Directory redirection whereby the entries into the redirection table are directory entries and entire directories are relocated. This can be done both by using an empty directory as a placeholder in the original source volume, or alternatively, by redirecting the directory without the use of a placeholder directory. The use of a placeholder directory simplifies the task of providing a virtual redirected directory but the alternate directory redirection method allows adding directories to read-only media.

Partial Directory redirection and relocation whereby a subset of the files are located on the original volume and the remainder exist on a relocated volume. When a file is opened through the use of a partially redirected directory, the original directory is used first to open the file, and then on failure, the relocated directory is used for opening.

File redirection by one of two alternative methods to redirect individual files. Either the use of empty zero length placeholder files in the original volume, or alternatively, by redirecting the file without the use of a zero length placeholder file can be used. The use of a placeholder file simplifies the task of providing a virtual redirected directory. However, the alternate file redirection method allows adding files to read-only media.

In one embodiment, when files are migrated to redirected volumes, a mirror of the directory structure is placed on the destination drive, or in the case of compressed directories, inside of the compressed file. This technique not only provides for a simple access method, but also provides for a redundant migration undo capability. If the VSMS components are taken entirely out of the system, the original file layout can be easily restored through a file move operation or use of a utility such as pkunzip.

Windows 95/98 contains a mechanism for intercepting file requests. FIG. 1A depicts the general concept of the Virtual Storage Management System (VSMS) and the position of the file redirector hook driver 26 under the Windows 95/98 platform and system architecture.

All file requests from application level 20 go to the "Installable File System Manager"—IFSM 22. IFSM 22 provides a hook mechanism for modules supplied by other vendors. IFSM 22 validates file requests by testing whether there is a corresponding drive, and prepares input data by converting strings to Unicode form, and formatting input data. Subsequently, the file request is passed to the first hook in the chain for processing 24. The File Redirector hook driver 24 is responsible for calling the next hook 28 for default processing. The last hook in the chain is always a special IFSM routine. The last hook in the chain passes prepared input data to the lower level File System driver 30.

For any hook there are several possible ways to act on each file request:

Option 1:
  Perform any actions appropriate for the particular file request;
  call the next hook;
  perform additional actions before default processing.

Option 2:
  Call the next hook;
  perform any actions appropriate for the particular file request;
  perform additional actions after default processing.

Option 3:
  Perform any actions appropriate for the particular file request;
  return to IFSM;
  replace the default behavior.

Option 4:
  Modify input data;
  call the next hook;
  change the default behavior.

Option 5:
  Call the next hook;
  modify output data;
  change the default behavior.

Versioning and mirroring modules use option 1. Redirection modules generally use option 5. In order for the virtual volume to be recognized at machine startup, the Redirector driver uses block device driver registration and is loaded automatically as are other block device drivers.

FIG. 1B represents the general architecture of VSMS for the Windows NT platform. VSMS uses the layered architecture of the Windows NT input/output system. File Redirector Driver (FRD) 44 is a file system filter driver that intercepts I/O requests from the Windows NT I/O Manager 42 and forwards these calls to the appropriate storage system. Calls forwarded to storage systems are processed by File System Driver 46 and/or 48 and Storage Device Driver 50 and/or 52 and then forwarded to Storage Device 54 and/or 56. Instead of calling File System Driver 46 and/or 48, FRD 44 can call the next level of filtering, providing additional and independent functionality. Depending on the VSMS configuration, FRD can provide different layouts of the lower storage systems, for example: a single volume with contents of several volumes; or a single volume with a free space as a sum of free spaces on all drives. In addition, the FRD 44 can backup and mirror the data on different storage devices. It can perform compression and encryption on data.

FIGS. 2A–2C illustrate Redirector processing of file requests for Open, Read/Write and Close operations.

FIG. 2A illustrates Open request Redirector processing. IFSM 22 converts input file name to canonical Unicode form, and determines drive number (1-A:\, 2-B:\, etc.). This input data is passed to the first hook 24 in the chain. The Redirector hook calls the next hook to do default processing of the original file. If the original physical file has been redirected, the original physical file is replaced with a zero length file.

Zero length files are used for several purposes. The main purpose is to handle complex requests. In default request processing, VSMS completes numerous output fields with control information. Control information received from processing of the default call is then used while working with redirected files on alternative drives. The zero length file is used to keep track of access rights in the case of multiple open requests at one time. By processing only zero length files, the number of Open file requests that need to be handled by the Redirector is limited.

If default processing is successful 60 and the file has zero length 62, then all output data has been completed and the Redirector should try to make the redirection link. File handles are used by the operating system to reference a file At the device driver level, there is a global inter-process file handle that is returned by the Open operation. The Redirector contains an internal list of opened files indexed by file handle with a reference count for each original file handle. The Redirector checks for handle in the list and does processing only if the file is not in the list 64. The next step is opening the corresponding file in destination mirror tree 68 using the same open mode. File name is calculated using the original name and destination settings. If the destination file is found and successfully opened 70, then its handle is placed in the corresponding list entry with the source file handle for further processing 72. The last step is to correct the size information in the output structure using the destination file size 74.

FIG. 2B illustrates Read/Write request Redirector processing. IFSM 22 passes information about the handle for the previously opened source file to the hook 24. The Redirector looks for such an entry in the list 80. If an entry is found, Redirector reads/writes the file by destination handle to/from a buffer supplied by IFSM 82. In this case Redirector replaces default processing 84 and does not call the next hook in the chain.

FIG. 2C illustrates Close request Redirector processing. The main purpose of this request is to close the file at the destination location and remove the entry from internal redirector list 92.

Figure 17:
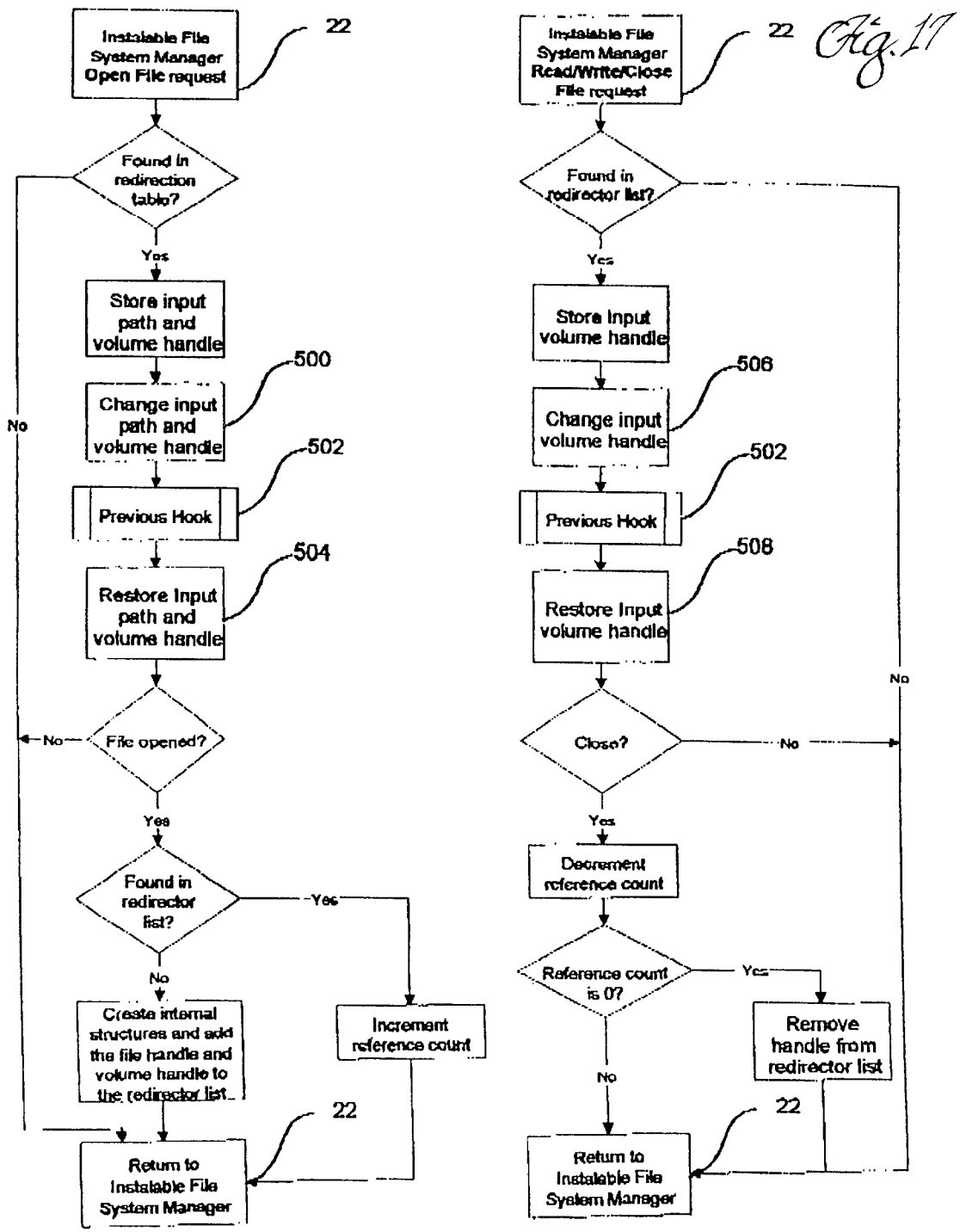
FIG. 17 is a set of flow diagrams showing processing of redirected file requests with the alternative Redirector method for Open File and for Read/Write/Close requests for the Windows 95/98 platform.

As mentioned above, an alternative Redirector method that uses a redirection table as opposed to zero length files, is used to facilitate, among other things, individual file redirection, volume redirection, directory redirection, and partial directory redirection. Redirection table redirection method processing differs slightly different from the redirection method that uses zero length files. FIG. 17 is a set of flow diagrams showing processing of redirected file requests with the alternative Redirector method for Open File and for Read/Write/Close requests for the Windows 95/98 platform. As shown in FIG. 17, many of the processing elements are similar to the elements for file level processing as shown in FIGS. 2A through 2C. With the Redirection table method, if the file, directory or volume is found in the redirection table, when an Open request is received from IFSM 22, the Redirector changes the input path and volume handle 500 and passes the data to default processing 502 and restores the input path and volume handle before returning 504. For other operations, such as read, write, close, etc., the input handle is already a destination handle. Therefore, the Redirector changes the volume handle 506 before default processing 502 and restores the input volume handle before returning 508.

Figure 18:
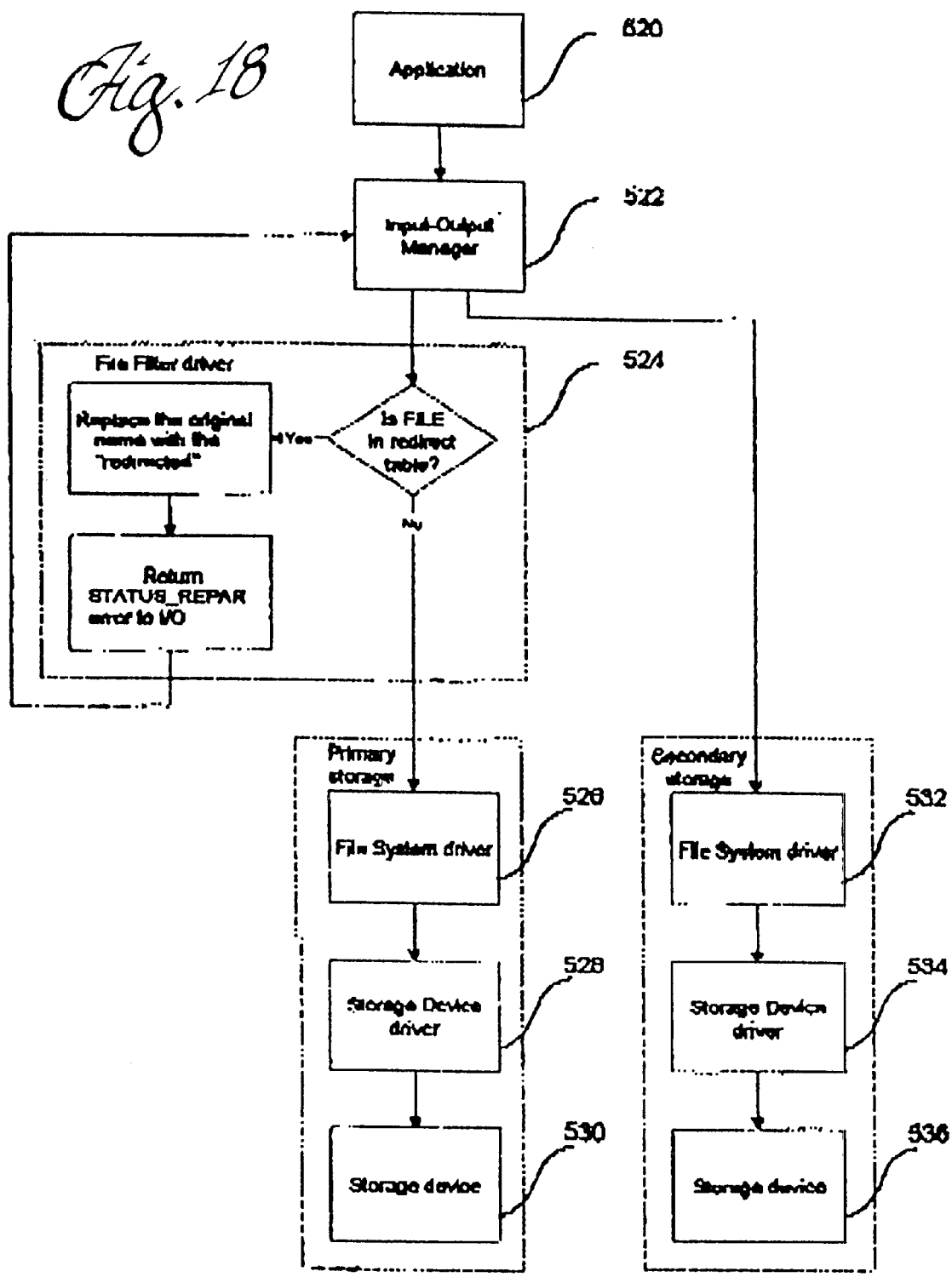
FIG. 18 is a schematic flow diagram showing processing of file requests with the alternative Redirector method for the Windows NT platform.

FIG. 18 is a schematic flow diagram showing processing of file requests with the Redirector table method for the Windows NT platform. The Redirector table method uses the layered architecture of the Windows NT input/output system. The File Redirector Driver (FRD) 524 is a file system filter driver that intercepts I/O requests from the Windows NT I/O Manager 522. For an initial access of a file, e.g., for an Open or Create request, if the full file name or an initial directory part of the file is found in the redirector table, then FRD replaces the filename with a name from the redirector table and returns the standard error code STATUS_REPARSE to the I/O manager. The STATUS_REPARSE error code causes the I/O Manager to repeat name parsing and to resend the file request (e.g., Open, Create, etc.) to another storage device. If the file request, e.g., Open, is successful, then all subsequent file requests, e.g., Read, Write, etc., go directly to the secondary storage 532, 534, 536. The Application 520, which requests the file operation, e.g., Open, does not know about the redirection processing and continues to process the file as if the file was in its original storage location.

The Redirector is capable of processing numerous file requests, including, but not limited to: Open, Read, Write, Seek, Lock/Unlock, Close, Enumerate Handle, Rename, Delete, Set/Get attributes, Make/Delete directory, Find First, Find Next, Find Close, and 16 bit search.

Figure 3A:
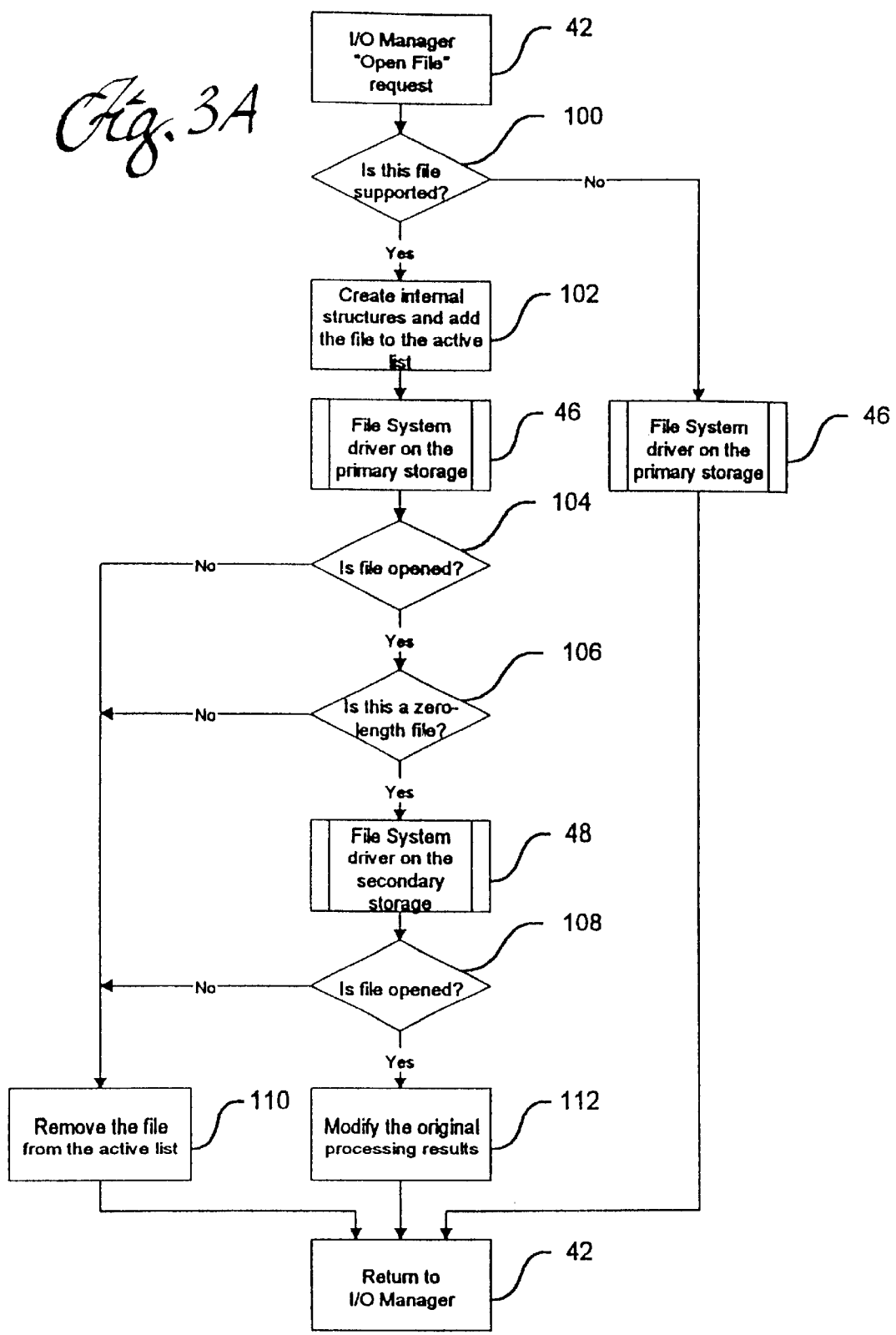
FIG. 3A is a flow diagram showing the processing for redirected file Open requests for the Windows NT platform.

FIG. 3A is a flow diagram showing the processing for redirected file Open requests for the Windows NT platform. The request comes from the I/O Manager 42 and contains the full file name, the desired access mode and additional attributes. According to the information contained in the request, the File Redirector Driver (FRD) filters out requests to unsupported files such as if the file is a swap-file, registry or system-protected file.

If the request passes the filter 100, FRD creates an internal representation of the file and includes it in the list of currently supported files (Current File List—CFL) 102. Then the request is passed to the File System Driver (FSD) on the primary storage 46.

The result of the FSD Open operation is analyzed 104. In case an error condition is encountered, FRD removes the file from the CFL 110, clears out the Internal structures and returns the error to the I/O Manager 42.

If the file is opened successfully, FRD performs additional checking of the file size 106. If the file has a non-zero size, FRD removes the file from the CFL 110, clears out the internal redirector structures and returns the error to the I/O Manager 42.

If the file has a zero length, the FRD attempts to open the associated file on the secondary storage using the FSD on the secondary storage 48. The pathname for this request is built from the original file name and the secondary storage prefix. Other request parameters are generated from the original request. FRD maintains a list of the secondary storage locations. In one embodiment, if the file cannot be opened, FRD consequently tries to open the redirected file on all storage devices until either the redirected file is found on one of them or until all storage devices have been checked. Other embodiments are possible. Another embodiment uses a database of redirected files.

If the new file is opened on the secondary storage 108, FRD modifies the processing result data returned from the primary storage 110 so that the actual file size and attributes are used from the secondary storage. FRD also replaces Cache Manager information, so the Windows NT standard read/write caching can be performed on the redirected file.

After I/O Manager 42 gets the modified result it handles the redirected file as if it is opened on the primary storage.

FIG. 3B represents the general scheme of processing redirected "Read/Write File" and "Close File" requests for the Windows NT platform. There are several other request types that are processed by one of these schemes. "Get/Set Position," "Flush Buffers," "Lock/Unlock File" are processed in a manner similar to the "Read/Write File" processing, except that they are processed on the secondary storage. "Get/Set File Attributes," "Get/Set File Date and Time," "Rename File," "Delete File," and "Cleanup File" are processed on both the primary and secondary storage devices. In the order of the redirected file requests, FRD modifies the In/Out Request Packet (IRP) structure, representing the I/O request, including changing target device object and target file object fields.

On a Close File request, the File Redirector Driver (FRD) tries to find the file in the Current File List (CFL) 100. If the file is not found, the request is passed to the File System Driver (FSD) on the primary storage 46 and the result is returned to the I/O Manager. If the file is found, the request is modified and passed to the secondary storage FSD 48. The result can be modified before returning to I/O Manager, according to the type of request. After the "Close File" request has been completed, the file is removed from the CFL 132.

Figure 7:
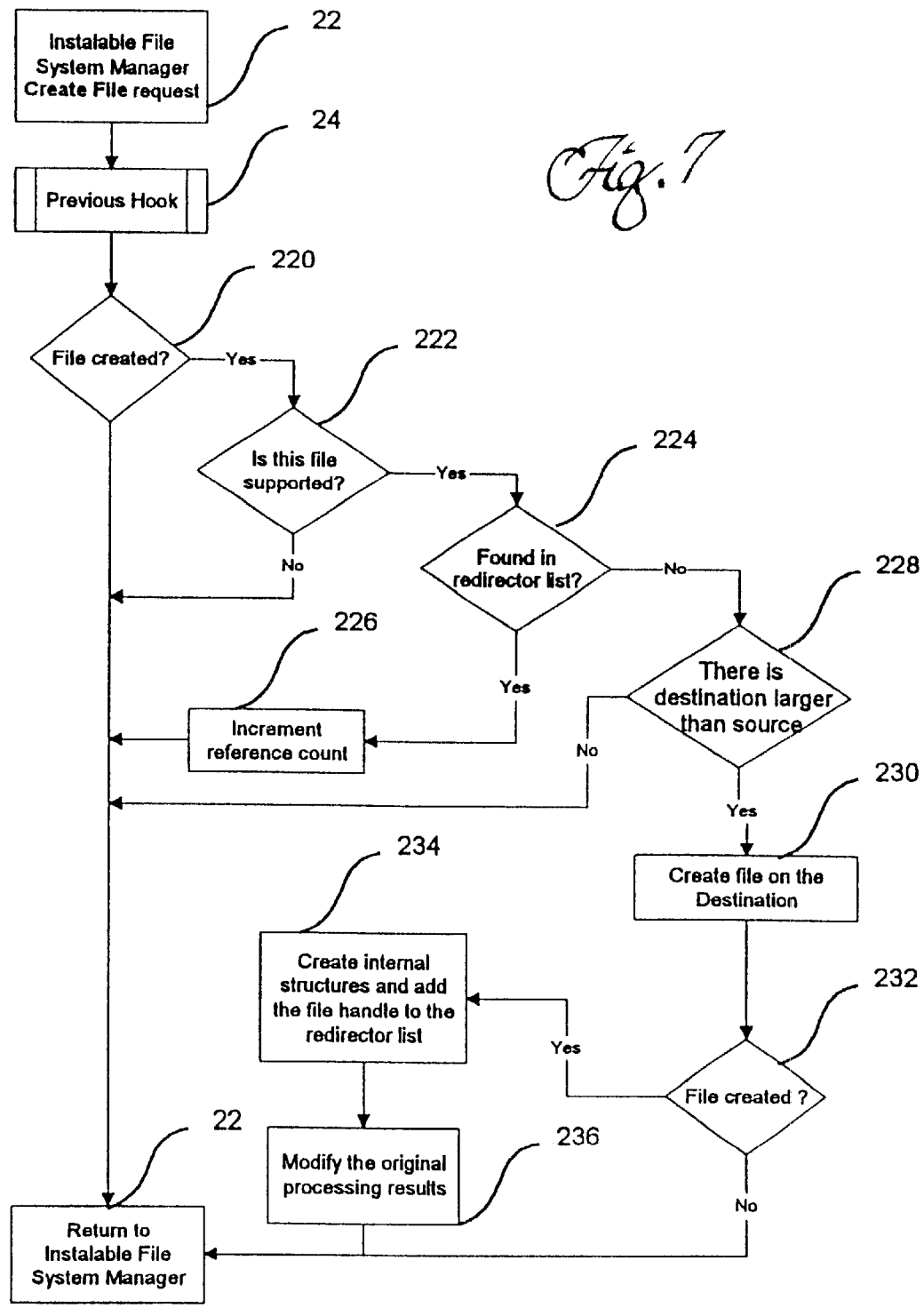
FIG. 7 is a flow diagram showing the Redirect New Files (RNF) redirector mode process.

One of the Redirector modes is Redirect New Files (RNF) (FIG. 7). This mode is useful for virtually making available to the system the total amount of free space on all volumes in the system. In this mode, all new files created and copied to the primary storage location automatically get relocated to the volume with the most available space and access to those files is provided through the Redirector if the file has been relocated. The benefit of the RNF mode is that file space is automatically balanced across primary and all secondary storage volumes. RNF logic is the same as in normal redirection mode with two exceptions:

1. In RNF mode, a file creation request is handled the same way as open request;
2. GetDiskFreeSpace (and GetDiskFreeSpaceEx under Windows 98) requests are also trapped and processed.

With respect to a "Create" request, IFSM converts the file name to canonical Unicode form, and determines the drive number (1-A:\, 2-B:\, etc.) 22. This input data is passed to the first hook in the chain 24. The Redirector hook calls the next hook to perform default processing of the original file, as shown in FIG. 2A. On successful completion, the original file will be created with zero length. The call arguments on the hook are completed. The Redirector looks for the storage device and/or volume with the most free space 228. If the most free space is located on the original drive, there is no more Redirector processing, and control is returned to the IFSM 22. Otherwise, the Redirector creates the corresponding file in mirror tree on the destination device and/or volume with the most free space 230. If the destination file is successfully created 232, its handle is placed in the corresponding list entry with a source file handle 234 for further processing 236.

In order to make the total amount of free space available on all volumes in the system appear available to application programs, the system call that reports free disk space is hooked and the return free disk space value is modified to reflect the total amount of free space on all volumes in the system. In Windows 95/98 and Windows NT, the system call that reports free disk space is GetDiskFreeSpace; in Windows 98, there is an additional system call , GetDiskFreeSpaceEx, that is handled. After default processing, the Redirector calculates disk information for all destination drives (total and free space) and changes output request data to match the new space. In case of a GetDiskFreeSpace request for space more than 2 GB, cluster size is increased accordingly.

All other requests are handled the same way as in normal Redirected mode.

Figure 8:
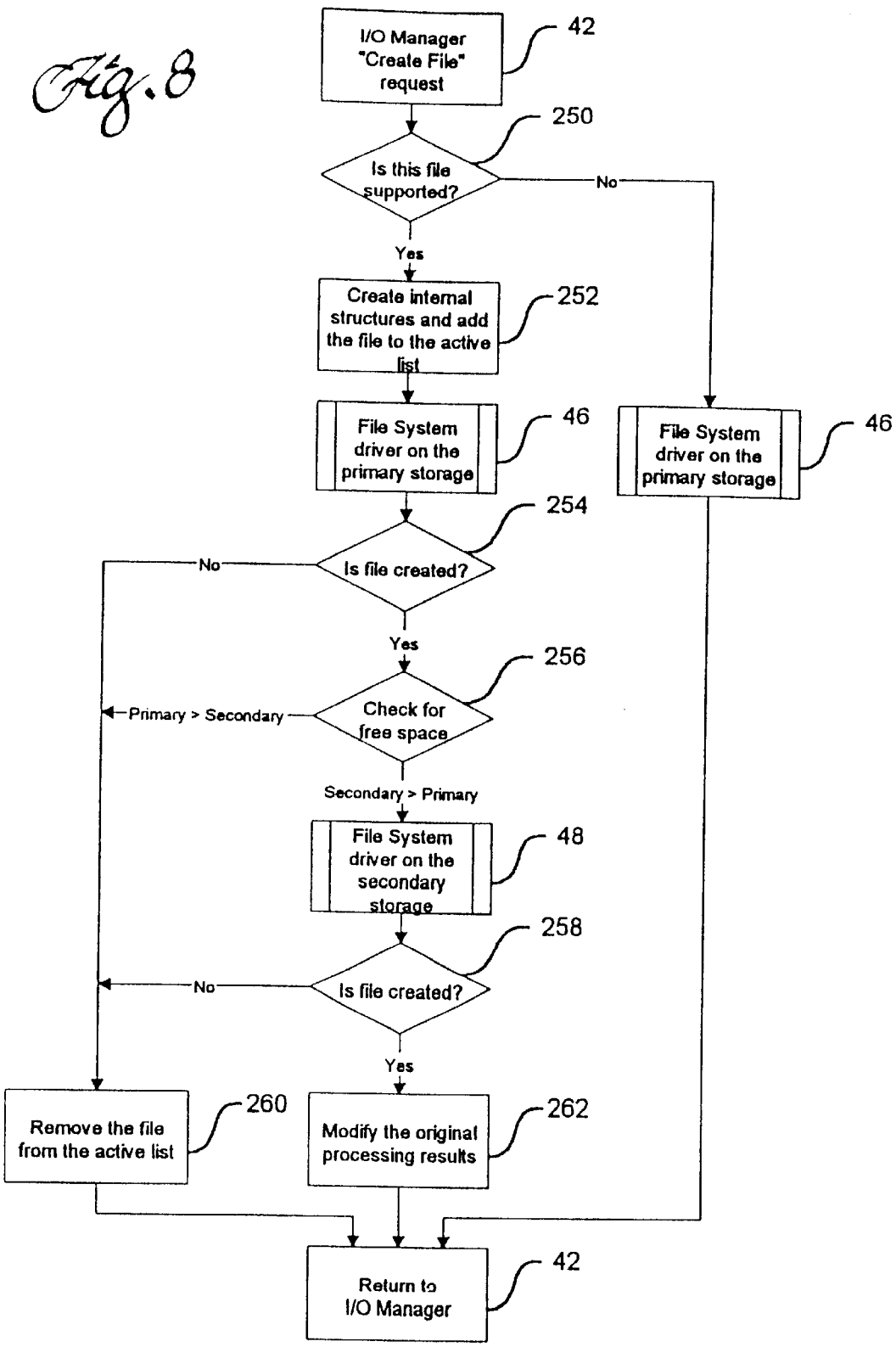
FIG. 8 is a flow diagram showing the general procedure of creating a new file in the RNF mode under the Windows NT platform.

FIG. 8 represents the general procedure of creating a new file in RNF mode under the Windows NT platform. The request comes from the I/O Manager 42 and contains the full file name and the desired creation attributes. According to this information, the File Redirector Driver (FRD) filter eliminates requests directed to unsupported files such as swap-files, registries, or system protected files 250. For unsupported files, the Create request is passed to the File System Driver (FSD) on the primary storage 46 which in turn returns control to the I/O Manager 42.

If the request passes the FRD filter, the RNF creates an internal representation of the file and includes it in the list of currently supported files (Current File List—CFL) 252. Then the create file request is passed to the File System Driver (FSD) on the primary storage 46.

FSD 46 returns the result of the create operation for analysis 254. In case of an error condition, FRD removes the file from the CFL 260, clears out the internal structures, and returns the error to the I/O Manager 42.

If the file is created successfully, FRD performs checking for free space on the secondary storage 256. If the secondary storage has less free space than the primary storage, the file is removed from CFL and from consequent processing 260. In case of several secondary storage devices, FRD chooses the one with the most free space.

If the secondary storage has more free space than the primary storage, FRD tries to create the new file on the secondary storage using the FSD on the secondary storage device 48. The pathname for this request is built from the original file name and the secondary storage prefix. Other request parameters are generated from the original request. FRD can maintain the list of the secondary storages. In this case, FRD continues to try to create the new file on successive storage locations until the file is created.

If the new file is created on secondary storage, FRD modifies the result data 262 returned from the primary storage. FRD also replaces Cache Manager information, so that Windows NT standard read/write caching can be performed on the redirected file.

After I/O Manager 42 gets the modified result, it operates on the redirected file as if it had been created on the primary storage.

Figure 9:
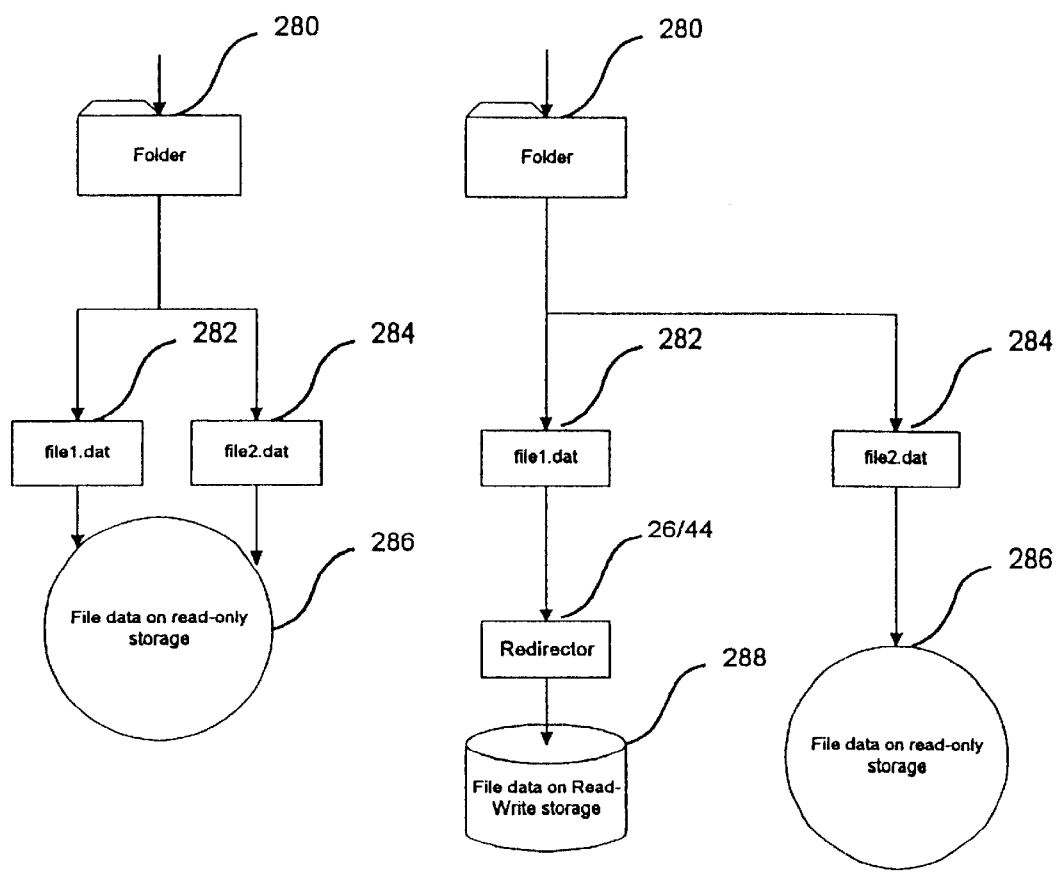
FIG. 9 is a schematic diagram showing the process of replacing or adding files on read only media.

The Redirector can be used for redirecting file operations for read-only media to files on read-write media. That is, the Redirector is capable of making a read-only device a virtual read/write device. This process is usually called patching. FIG. 9 shows this process.

Figure 11:
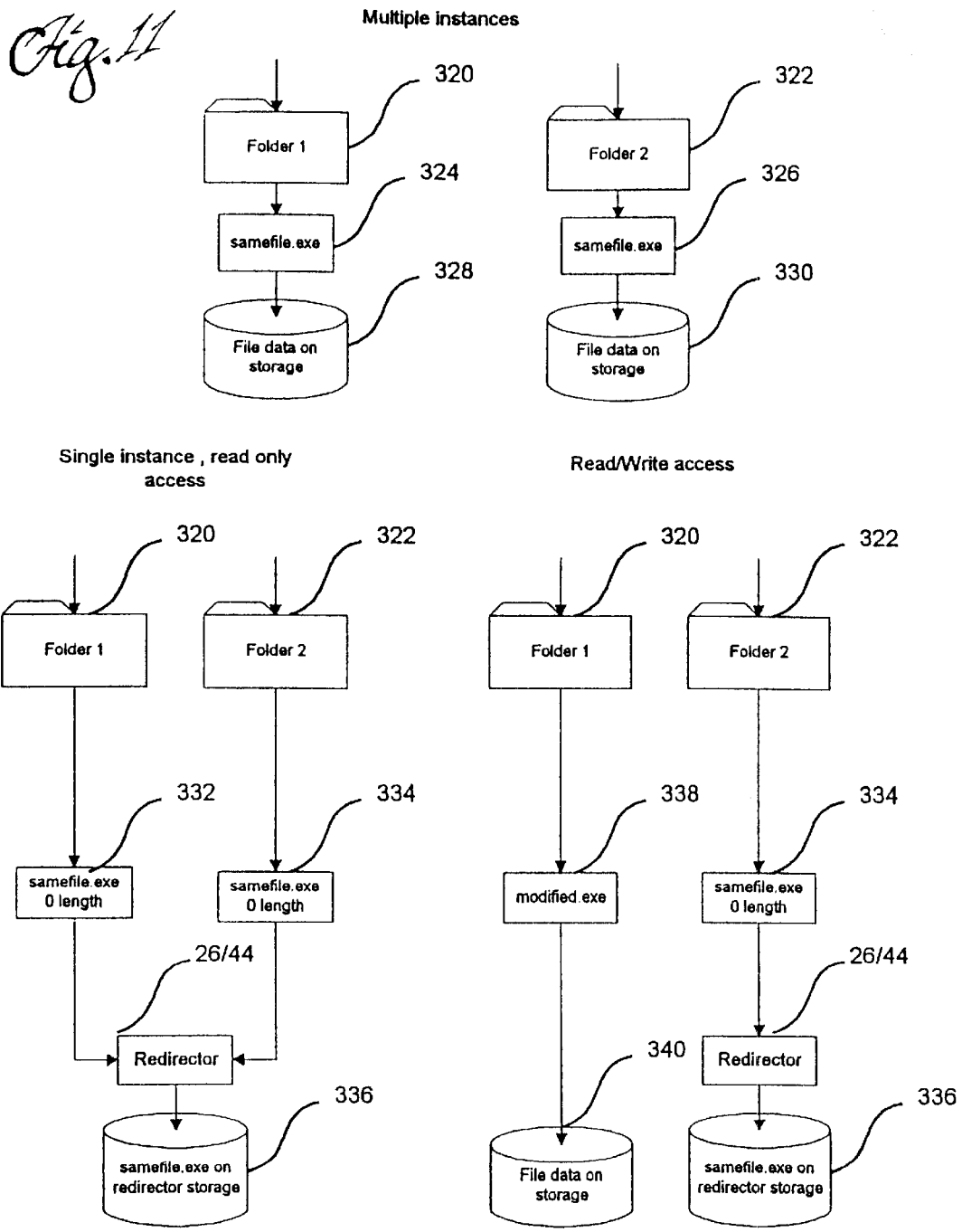
FIG. 11 is a set of four schematic diagrams representing the "Single Instance" application of redirector in which case zero length files replace multiple identical copies of files.

In the case of patching read-only media, the Redirector table method is used to process requests for all files on the read-only media. Read-only drive 286 in this case is the source drive. The corresponding mirror tree is prepared on read-write drive 288. FIG. 9 shows the process of substituting file1.dat 282 with a new version of this file on a read/write volume 288 using Redirector 26/44 Another application of the Redirector is the "Single Instances" application as shown in FIG. 11. In the "Single Instance" application, zero length files 332, 334 replace multiple identical copies of files 328, 330; and real file contents 336 are accessible through Redirector 26/44. In one embodiment of the "Single Instance" application, a file located on a shared volume, such as a network server, can be made to appear as local logical files on multiple client machines.

Special support for file modification is implemented to support the "Single Instance" application. If a particular instance of the "Single Instance" file is modified, then "Single Instance" redirection for this file has to be discontinued for this file so that the file can be copied to it's original location 340 and then modified.

2. The Migrator

The physical movement of files is accomplished through the use of a VSMS Migrator component. The Migrator makes a copy of the file, verifies the correctness of the copy, updates the redirector table, and then removes the physical file from its original location.

Figure 4:
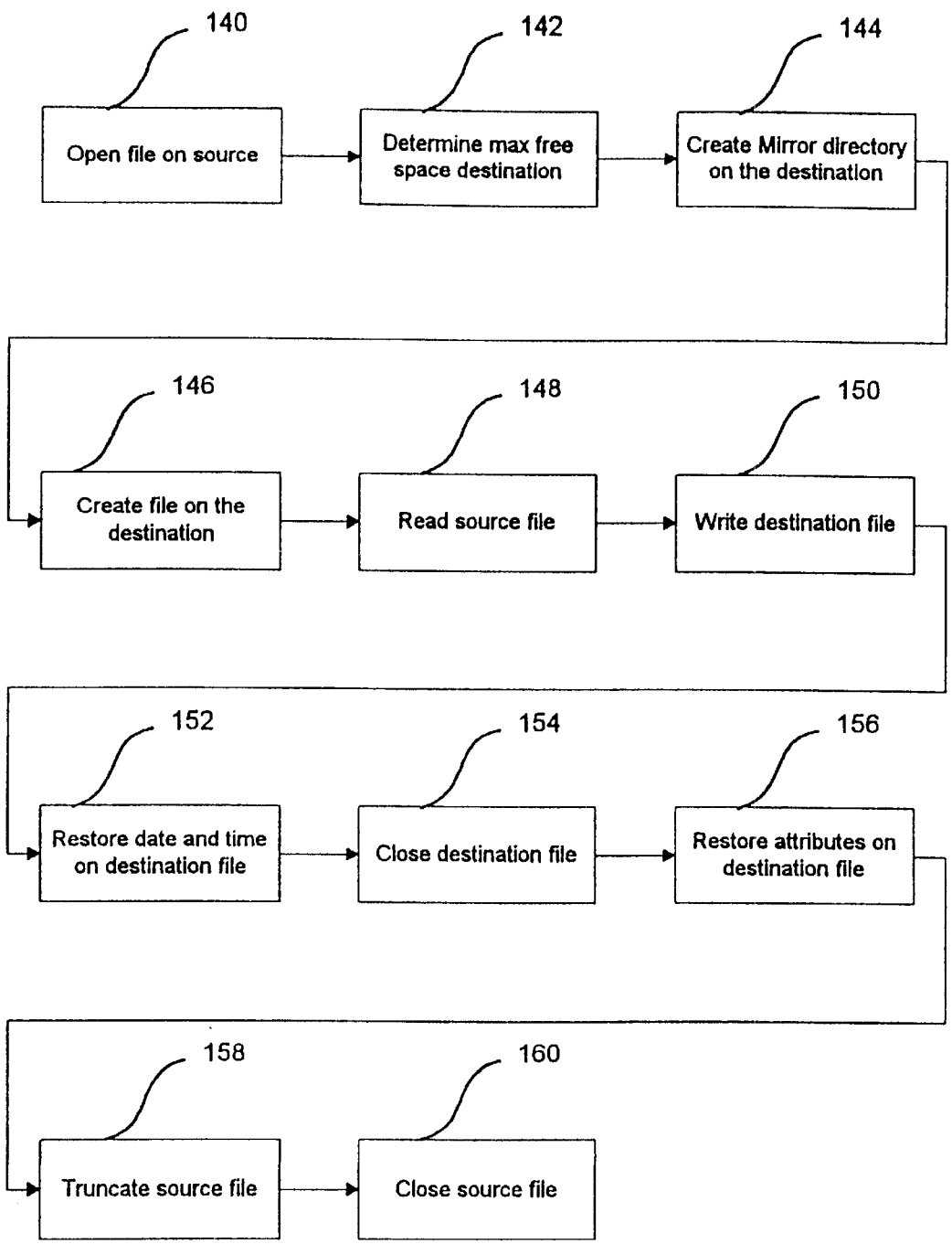
FIG. 4 is a schematic block diagram showing the process of relocating a file from its source storage location to an alternative storage location.

FIG. 4 shows the process of relocating a file from it's source location to alternative storage. The relocation process consists of copying the original file to a secondary storage location and truncating the original file. Sets of files to be migrated can be identified using different algorithms. The key characteristic of the file migration process is full independence from the Redirector driver. No notification from the Redirector is necessary to activate the Relocation process.

If the original file has a non-zero size, the Redirector does not handle it. The relocation module first opens the original file 140. The relocation module then determines the storage location with the most free space among all possible destinations 142. The relocation module then copies the file with all appropriate attributes and date/time to the corresponding mirror tree on the destination storage location 144–156. The relocation module then truncates the original file 158 and closes it 160. Any other open operation will be handled in the Redirection mode.

Figure 5:
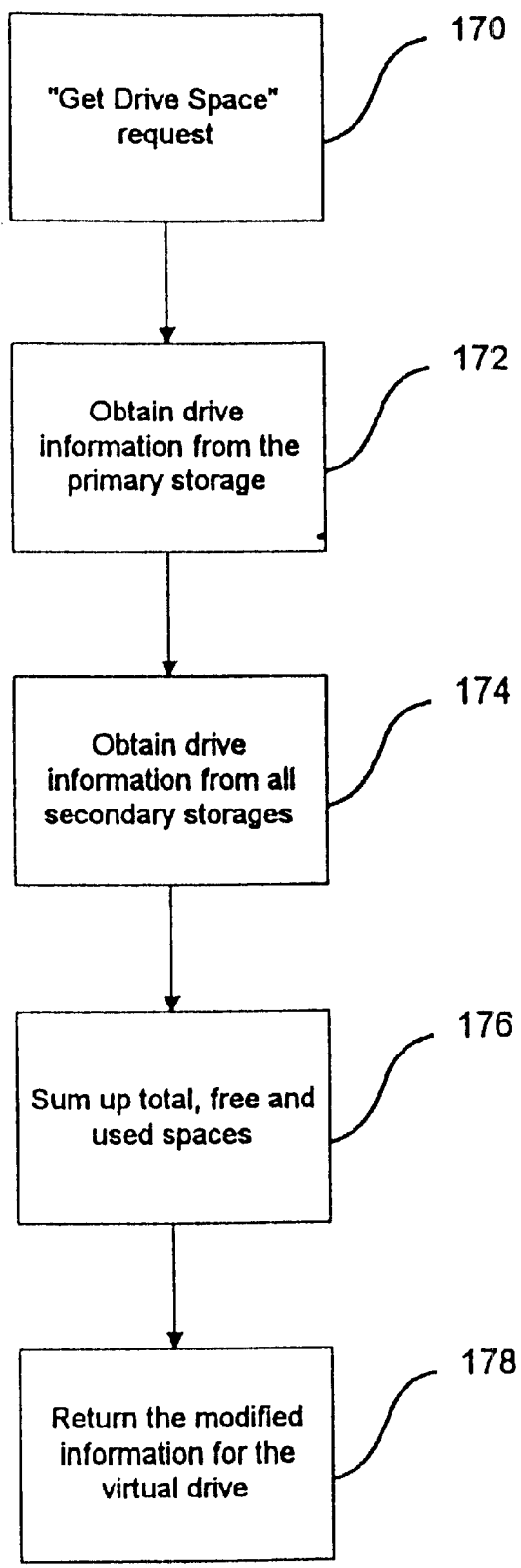
FIG. 5 is a schematic block diagram showing the process of determining the total, used, and free space on primary storage.

FIG. 5 is a schematic block diagram showing the process of determining the total, used and free space on the primary storage. After obtaining the actual data from the primary storage 172, the Redirector driver requests the same information from all secondary storages 174. Then the sum of all requests 176 is returned as a size of the virtual primary storage 178.

FIG. 6 is a schematic diagram representing two possible approaches for merging partitioned space and the storage efficiencies resulting from the two approaches. Both approaches allow merging small partitions 182, 184, 186, 188 and 202, 204, 206, 208 with different file systems into one virtual volume.

The first approach depicted shows that the cluster size on the virtual volume 192 is much smaller than the cluster size on the physical volume of the same volume size 180. This approach allows the reduction of cluster space loss on volumes with a large number of small files.

The second approach demonstrates the creation of virtual volume 212 with a logical size larger than the physical size supported by the FAT16 file system. The FAT16 file system physical limitation is 2 GB. Windows NT 4.0 supports FAT16. FAT32 doesn't have the 2 GB physical size limitation. However, FAT32 is not supported under Windows NT 4.0.

FIG. 10 represents two methods of accessing migrated files in the Virtual Storage Management System. Migration agents 310 distribute files across several devices 302, and 304, while redirectors 26/44 virtually maintain the files on the primary storage.

The first approach, "consequent redirection," virtually extends the secondary storage by additional high-capacity storage devices. The client Redirector does not need to know the actual physical location of a file.

The second approach, "parallel redirection," optimizes and speeds-up the access to the migrated data.

B. Data Protection

The invention provides unparalleled protection for data, whether it resides on network servers, desktop workstations, or laptop computers. Its comprehensive data protection includes both versioning and mirroring.

1. Versioning

The invention maintains an audit trail of all changes to specified files, so that users can easily rewind to previous versions if the current versions are damaged. The administrator selects which directories and file types are to be versioned. The administrator also selects the number of versions to be stored. The first time versioning is activated, the invention stores a copy of the current version of each specified file. (This baseline copy of versioned files can be compressed for storage efficiency.) Each time a change is made to any of the specified files, the invention saves a trail of the changes so that the user can rewind to a previous version if desired. Because the invention stores only the changes for each version, it is storage efficient. The invention can secure versioning information with encryption and password protection to prevent unauthorized access.

Versioning is based on architecture similar to the architecture for Redirection. The difference is that all actions are made before default processing and no modifications to default processing of the original file are necessary.

The Versioning driver processes numerous file requests, including the following: Open, Write (Read for special case) and Delete which are generally the only file requests that affect file contents.

Figure 14:
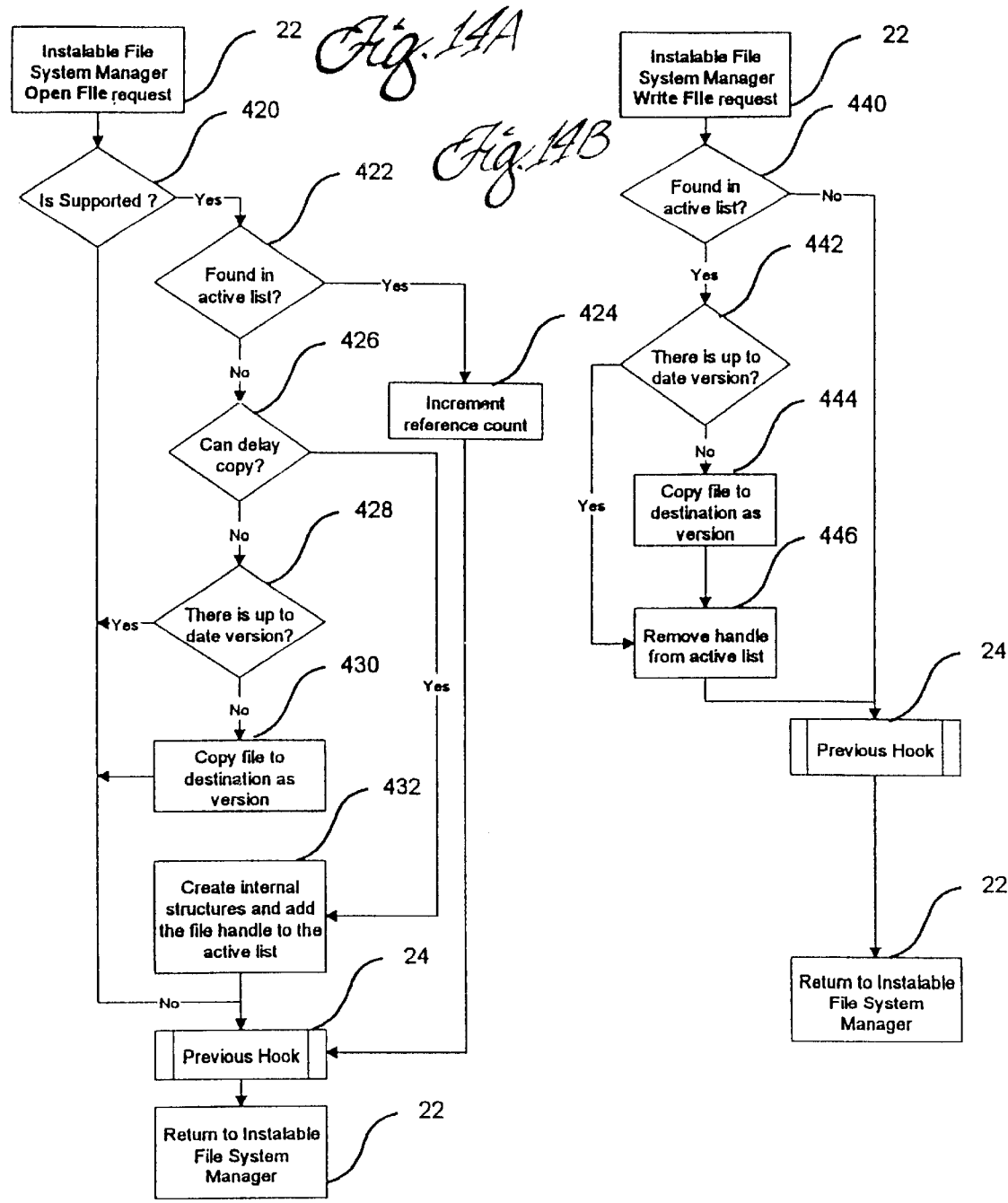
FIGS. 14A and 14B are two flow diagrams showing the versioning process under the Windows 95/98 platform.

FIG. 14A is a flow diagram showing the versioning process for an Open file request under the Windows 95/98 platform. The purpose of Open file request Version handling is to prepare an internal open file list for further processing or to make a file version if further processing is impossible. If the file is supported and not found in the active list (not opened prior to this time by any application), then the Version module tests to determine whether it is possible to delay version creation until the first Write file request.

Version creation can not be delayed in the following situations:

1. File is opened in truncate mode.
2. File is opened in deny read mode.

If version creation can not be delayed 426, then the Version module tests to determine whether there is an up-to-date version 428; if not, the Version module makes a version copy of the unmodified file 430. The test 428 is performed to avoid unnecessary copy operations. In some cases, a file can be opened many times but not modified. If the copy process can be delayed, the file name is placed in the internal list and is indexed by the original file handle 432. Then, the Version module calls default processing.

FIG. 14B is a flow diagram showing the versioning process for a Write file request under the Windows 95/98 platform. Before default processing, the Version module tests whether the file handle is in the active list 440. If yes, the Version module creates the file version using the file name stored in the active list 444, and removes the file name from the active list 446.

For a Delete request, the file Version is created before default processing.

There is a special case. If the write request is a part of Windows NT/Multi-Media File (MMF) processing, then the described scheme is not used. Instead, a special read request is performed which notifies the Version module that the MMF mode is started; the version will be created on this read request instead of at the time of the first write request.

Figure 15:
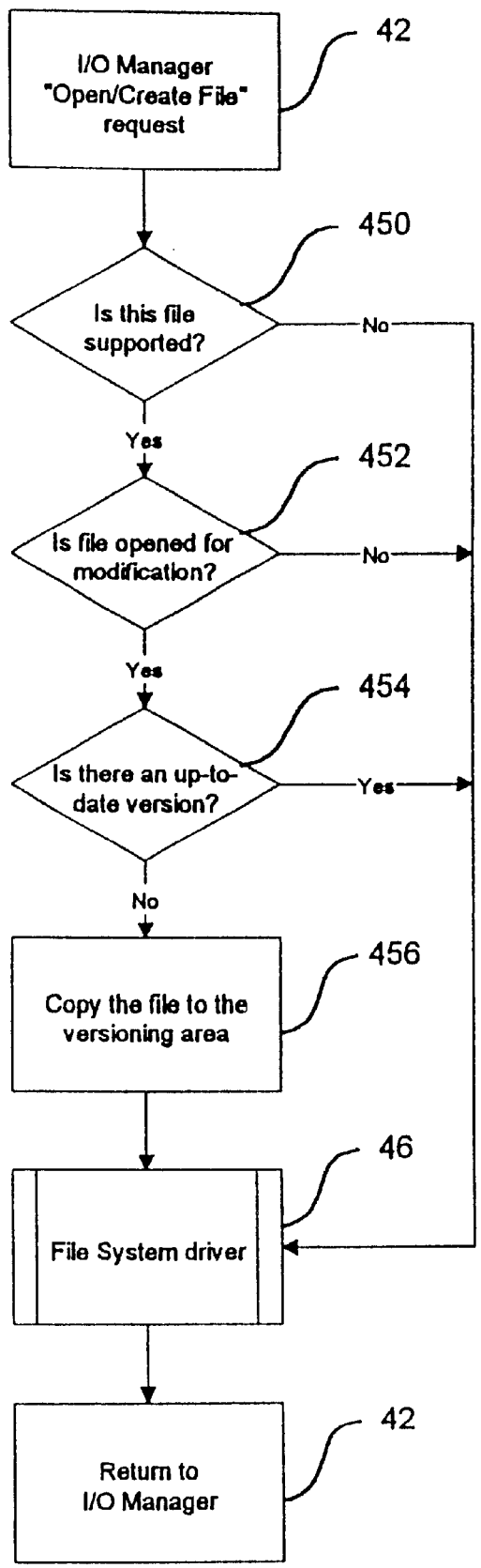
FIG. 15 is a flow diagram showing the versioning process under the Windows NT platform.

FIG. 15 shows the Version creating process under the Windows NT platform. The request comes from the I/O Manager 42 and contains the full file name, the desired access mode and additional attributes. According to this information, the File Redirector Driver (FRD) filter eliminates the request if:

1. The file is unsupported—as in the case of a swap-file, registry or system-protected file 450.
2. The file is opened in read-only mode 452.

Opening files for modification includes:
    open for write open for append
open with truncate (overwrite)
open for delete
open for set attributes—set file size
3. The file already has the up-to-date version in the versioning area 454.

In other cases, FRD copies the file to the versioning area 456. Then the request is passed to the FSD 46 and returned to the I/O Manager 42.

The invention provides an operating system versioning capability that automatically checkpoints all Windows 95, Windows 98, or Windows NT system files and the registry at each system boot. In addition, a user can checkpoint the operating system at any time.

Versioning is particularly useful in recovering information that has been unintentionally altered, such as a file that was inadvertently overwritten by a user or damaged by a software install or update. For example, if a user overwrites a file by forgetting to rename it before saving it, the user can simply rewind to the previous version to recover the file.

Figure 16:
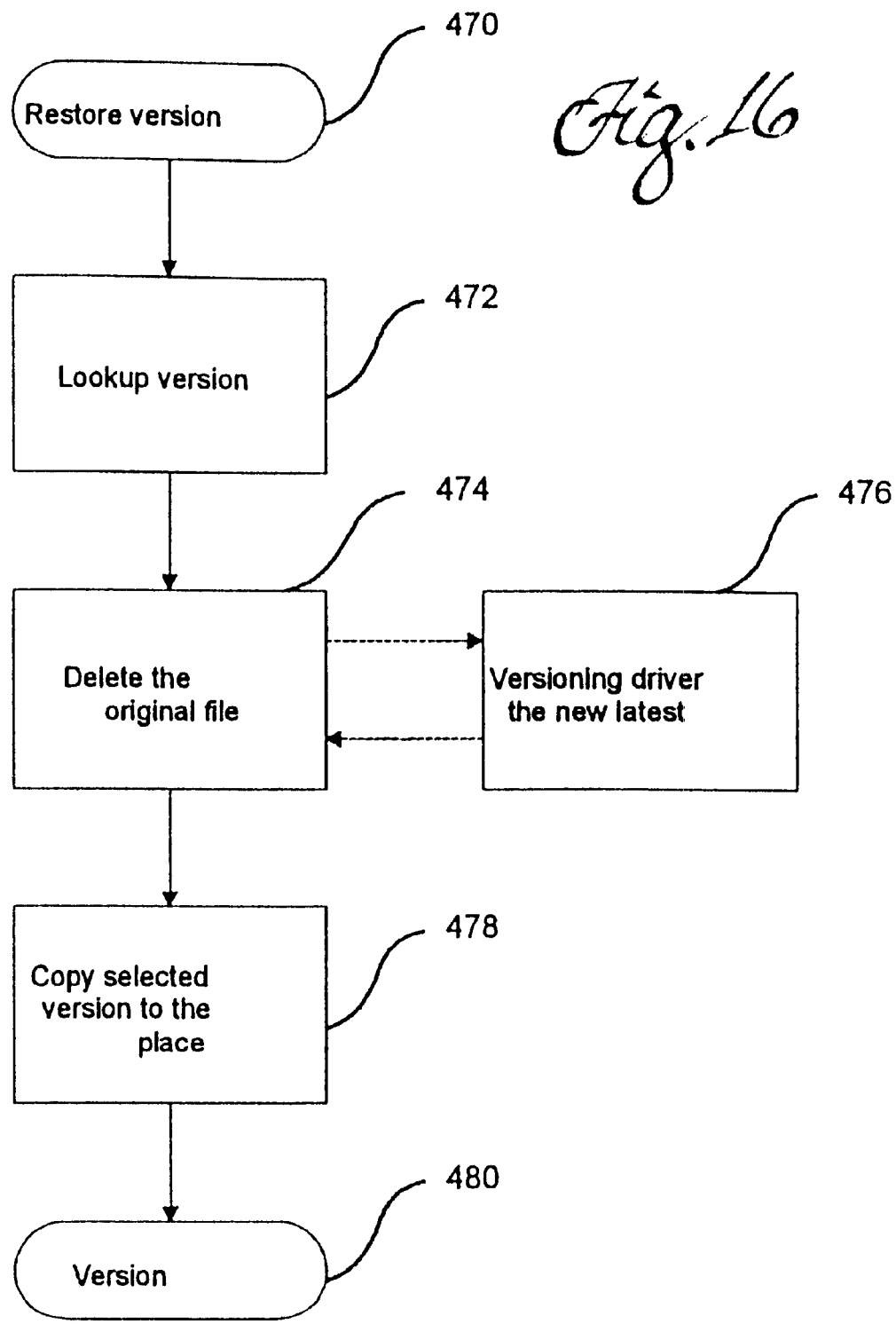
FIG. 16 is a schematic diagram showing the scheme of the version recovery process.
Figure 19:
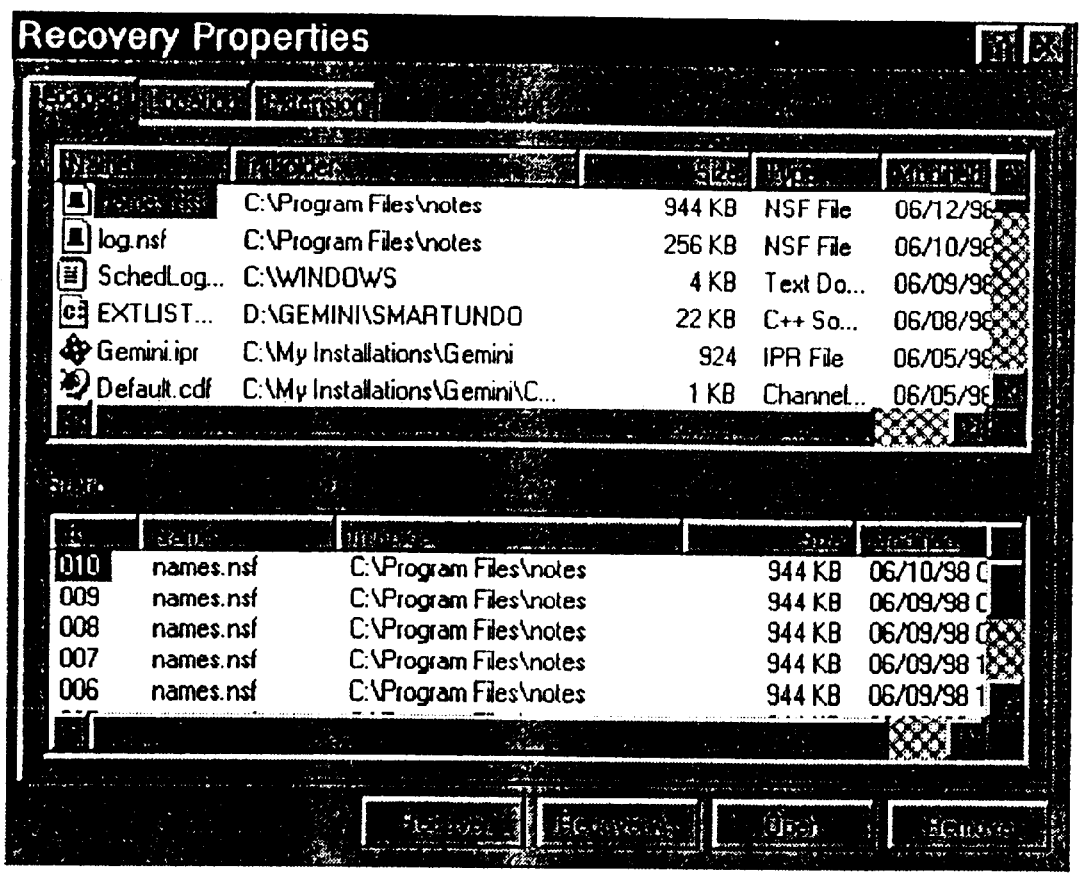
FIG. 19 is a screen display showing the on-screen display of recoverable files from which users can select to "rewind" to a previous version of a file.

FIG. 16 is a schematic diagram showing the scheme of the version recovery process. Restore application (RA) 470 gets the desired file and the identification of the version for recovery from it's own user interface or from other modules using command line interface. RA finds a file representing the required version in the versioning area 472. RA tries to find the original file and, if it exists, deletes it 474. On the delete request, the VSMS versioning driver creates the new version of the specified file 476, so that the latest contents of the file are not lost. RA copies the selected version to the original file Location 478. FIG. 19 shows an on-screen display of the version selection "rewind" recovery user interface.

2. Mirroring

The invention provides comprehensive data protection by mirroring selected information from desktop computers, laptop computers, and network servers to backup local volumes or network volumes. Mirroring allows users to recover lost information quickly. The invention can secure mirrored information with encryption and password protection.

Mirroring is a process of maintaining an identical copy of an original file at an alternative location. In the current invention, mirroring is based on an incremental model. In the current invention, mirroring means that all modifications in the original file are identically applied to the mirror copy as soon as these modifications are made.

The Mirroring driver processes numerous file requests, including but not limited to: Open, Write (Read for special case), Lock/Unlock, Close, Delete, and Rename, which is used to handle file name and location synchronization.

Generally, mirroring is done on each Write request by writing input data to the mirror copy in addition to default processing.

Figure 12:
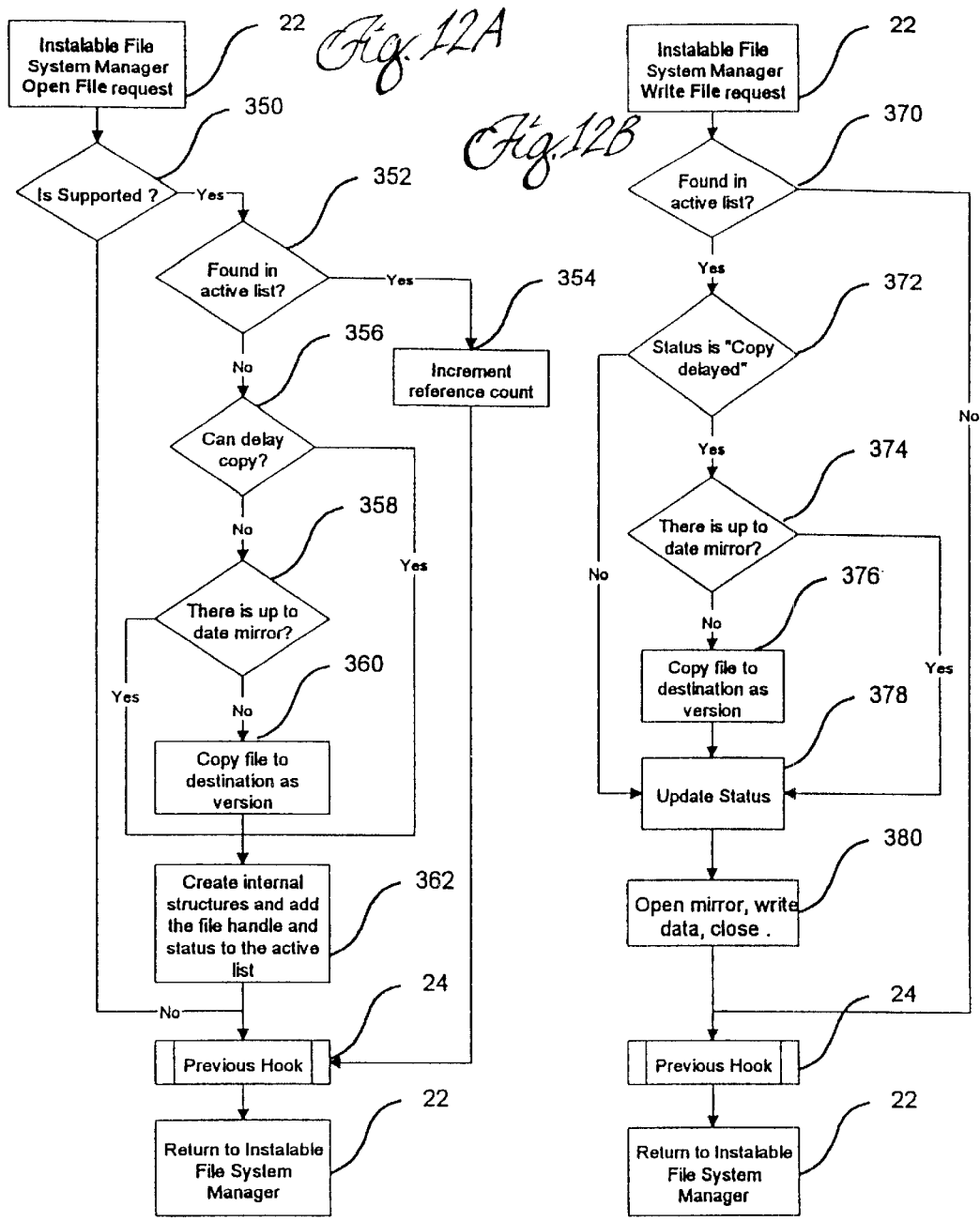
FIGS. 12A and 12B are two flow diagrams showing the mirroring process of maintaining an identical copy of an original file at an alternative location under the Windows 95/98 platform.

FIG. 12A is a flow diagram showing the mirroring process for an Open file request under the Windows 95/98 platform. The purpose of Mirroring Open request handling is to prepare the internal open file list for further processing and to make a baseline mirror copy of the file if no up-to-date mirror is available. If the file is supported 350 and not found in the internal open file list (that is, the file has not been opened prior to this time by any application) 352, then the mirror module checks if it is possible to delay mirror creation until the first write request 356. The Mirror copy creation can not be delayed if file is opened in deny read mode.

If mirror copy creation can not be delayed, then the Mirror module checks to determine whether any up-to-date mirror is available 358; if not, the Mirror module makes a copy of the unmodified file on destination drive 360. The prior-mirror check is performed to avoid making unnecessary mirror copies such as in the case where a file has been opened many times but not modified. The file name is placed in the internal list and is indexed by the original file handle 362. Then, the Mirror module calls default processing 24 and 22.

FIG. 12B is a flow diagram showing the Mirror processing for a Write file request under the Windows 95/98 platform. Before default processing, the Mirroring module tests whether the file handle is in the active list 370. If yes, and if the mirror creation has been delayed 372, Mirror processing creates the file mirror copy using the file name stored in the list 376. If an up-to-date mirror copy is available 374, then the copy process is bypassed. The Mirror module writes input data to the mirror copy. After performing all appropriate actions, the Mirror module performs default processing.

With respect to a Close file request, the Mirror processing removes the corresponding list item from the internal file list.

An exception in Mirror processing is made if a write request is a part of MMF processing, in which case, the described scheme is not used. Instead, a special read request is created. The special read request notifies the Mirror module that MMF mode is started; incremental mirroring is disabled; and the mirror will be created on the file Close request.

FIG. 13 represents the scheme of mirroring files under the Windows NT platform. The file request comes from the I/O Manager 42 and contains the full file name, the desired access mode and additional attributes. According to this information, the File Redirector Driver (FRD) filter 400 eliminates requests directed to unsupported files such as a swap-file, registry, or system-protected file.

If the request passes the FRD filter then the Mirror module creates an internal representation of this file and includes it in the list of currently supported files (Current File List—CFL) 402. Then the file request is passed to the File System Driver (FSD) 46 on the primary storage.

FSD 46 returns the result of the open operation. In case of the error condition, FRD removes the file from the CFL 406 clears out the internal structures, and returns the error to the I/O Manager 42.

In the case of a "Close File" request from the I/O Manager 42, the FRD 46 tries to find the file to be closed in the CFL 410. If the file is found but not modified 412, then FRD removes the file name from the CFL 406 and the request is passed to FSD 46 for return to the I/O Manager 42.

If the file should be mirrored, then FRD copies the file to the mirroring area 414, removes it from CFL 406, cleans up the internal structures and returns control to the the I/O Manager 42.

To maximize efficiency and optimize performance, users/administrators have flexibility in specifying the level of mirroring. The user/administrator can specify mirroring levels, including, file level, block level, or sector level. Block-level mirroring of large databases allows a high level of protection without degrading network performance. Sector-level mirroring allows a user to clone a disk image for copying onto another disk. In addition, the user/administrator can specify mirroring to a hybrid level that includes both file level and sector level. This enables users to create a complete copy of the system, including non-Windows boot sectors, for recovery in the case of system software loss or damage.

In a network embodiment, if a file is changed in a laptop computer while it is disconnected from the network, the invention mirrors that file when the computer is reconnected to the network.

Recovery of mirrored information is fast and easy. In a network embodiment, if Windows is available, the user simply performs a file restore operation that restores the mirror from a server over the network. If Windows is not bootable, the user inserts a recovery diskette and then restores the mirror from the server in either batch or dialog mode using a familiar, Windows-like graphic interface that runs under DOS.

C. Continuous Protection

Unlike traditional enterprise storage management systems, the invention performs continuous and real-time mirroring and versioning of data. For example, each time a user saves a file, the invention automatically and immediately mirrors the contents of that file. The unique continuous mirroring and versioning capability protects data more completely than conventional, scheduled mirroring or versioning. Real-time agents are implemented as file system filters below the application level to provide broad continuous support across all applications. Because it is tightly integrated within the file system, the invention is able to accomplish real-time, continuous mirroring and versionion of data.

By mirroring and versioning data on a continuous basis, the invention levels network loading due the random nature of user operations. This allows the invention to provide a high level of protection without significantly impacting network performance.

Source Code

Source code for embodiments of some of the components of the invention are attached hereto as Appendices A, B, and C. The attached source code is incorporated by reference as if fully stated here.

Illustrative Embodiments

The embodiments of the invention described herein are only considered to be preferred and illustrative of the inventive concept; the scope of the invention is not to be restricted to such embodiments. Various and numerous other arrangements may be devised by one skilled in the art without departing from the spirit and scope of this invention. For example, the disclosed system for virtual memory management can be used with operating platforms other than Windows 95/98 and/or Windows NT.

What is claimed is:

1. A programmed computer system for managing electronic data storage comprising:

means for physically moving electronic data from a source location recognized by a computer operating system and by one or more application software programs to a new destination storage location on the same or other electronic data storage device;

means for communicating the new destination storage location of the electronic data to the computer operating system;

means for translating the new destination storage location of the electronic data to one or more application software programs so that said application software programs do not detect any change in the location of the electronic data;

means for updating said application software programs to request the operating system to access said electronic data as if said electronic data is located at the source storage location;

means for redirecting the operating system from the source electronic data storage location to the new destination storage location in order to provide the operating system with access to the electronic data at the new destination storage location.

2. The programmed computer system of claim 1 wherein said communicating means, said translating means and said redirecting means includes:

a mirrored directory tree, with one or more entries, wherein each entry identifies the name of a file of said electronic data that has been physically moved to a new destination storage location as it was named when the file was originally stored on a primary storage device, the source file storage location, a new file handle, and a new destination storage location;

a zero length file stored at the source file storage location;

computer software to program the computer to interpret for one or more application programs and for the computer operating system each of the entries in said mirrored directory tree.

3. The programmed computer system of claim 1 wherein the moving means further comprises:

means for determining which of a plurality of electronic data storage devices contains the most amount of free space;

means for physically transferring electronic data from a source storage location recognized by a computer operation system and by one or more application software programs to a new destination storage location on the electronic data storage device which has been identified as being the storage device with the most available free space.

4. The programmed computer system of claim 1 wherein said source data storage location is on a read-only electronic data storage device and wherein said new destination storage location is on an electronic data storage device capable of executing read-write instructions.

5. The programmed computer system of claim 1 wherein said physically moved electronic data comprises the data content of an entire file.

6. The programmed computer system of claim 1 wherein said physically moved electronic data comprises the data content of an entire directory.

7. The programmed computer system of claim 1 wherein said physically moved electronic data comprises the data content of an entire physical storage volume of data.

8. A programmed computer system for replacing a plurality of identical copies of a particular set of electronic data with a single complete copy of said data, comprising:

means for identifying a plurality of physical storage locations of identical copies of a particular set of electronic data;

means for storing a zero length file at all but one of the plurality of physical storage locations of the identical copies of a particular set of electronic data;

means for redirecting a computer operating system from the location of a zero length file representing an eliminated duplicate identical copy of said particular set of electronic data to the location of the remaining copy of said particular set of electronic data;

means for the operating system to access the particular set of electronic data physically stored at the location of the remaining copy of the particular set of electronic data as if the data was stored at the location of one of the zero length files representing one or more of the eliminated duplicate identical copies.

9. A method for managing electronic data storage comprising the steps:

physically moving one or more bytes of electronic data from a source location recognized by a computer operating system and by one or more application software programs to a new destination storage location on the same or other electronic data storage device;

communicating the new destination storage location of the electronic data to the computer operating system;

translating the new destination storage location of the electronic data to one or more application software programs so that said application software programs do not detect any change in the location of the electronic data;

preparing requests by application software programs to the operating system to access said electronic data as if said electronic data is located at the source storage location;

redirecting the operating system from the source electronic data storage location to the new destination storage location in order to provide the operating system with access to the electronic data at the new destination storage location.

10. A method for replacing a plurality of identical copies of a particular set of electronic data with a single complete copy of said data, comprising the steps:

identifying a plurality of physical storage locations of identical copies of a particular set of electronic data;

storing a zero length file at all but one of the plurality of physical storage locations of the identical copies of a particular set of electronic data;

redirecting a computer operating system from the location of a zero length file representing an eliminated duplicate identical copy of said particular set of electronic data to the location of the remaining copy of said particular set of electronic data;

accessing the particular set of electronic data physically stored at the location of the remaining copy of the particular set of electronic data by the operating system as if the data was stored at the location of one of the zero length files representing one or more of the eliminated duplicate identical copies.

* * * * *